United States Patent
Saitou et al.

(10) Patent No.: US 8,237,137 B2
(45) Date of Patent: Aug. 7, 2012

(54) PHOTOELECTRONIC SENSOR SYSTEM HAVING AUTO-ADJUSTMENT FUNCTION

(75) Inventors: Yoshitane Saitou, Kameoka (JP); Kenji Nishikido, Takatsuki (JP)

(73) Assignee: Anywire Corporation, Kyoto (JP)

( * ) Notice: Subject to any disclaimer, the term of this patent is extended or adjusted under 35 U.S.C. 154(b) by 523 days.

(21) Appl. No.: 12/480,142

(22) Filed: Jun. 8, 2009

(65) Prior Publication Data
US 2010/0308210 A1 Dec. 9, 2010

(51) Int. Cl.
*H04B 10/00* (2006.01)
(52) U.S. Cl. .......................... 250/551; 398/164
(58) Field of Classification Search .................. 250/221, 250/551, 558; 385/15, 16, 22–24
See application file for complete search history.

(56) References Cited

U.S. PATENT DOCUMENTS

| | | | |
|---|---|---|---|
| 5,245,680 A | * | 9/1993 | Sauter .............................. 385/24 |
| 5,923,451 A | * | 7/1999 | Karstensen et al. ........... 398/164 |
| 6,661,940 B2 | * | 12/2003 | Kim .................................. 385/15 |

FOREIGN PATENT DOCUMENTS

| | | |
|---|---|---|
| JP | 4-249338 | 9/1992 |
| JP | 2874020 | 1/1999 |
| JP | 2009-124666 | 6/2009 |

OTHER PUBLICATIONS

English language Abstract of JP 4-249338, Sep. 4, 1992.

* cited by examiner

*Primary Examiner* — Tony Ko
(74) *Attorney, Agent, or Firm* — Greenblum & Bernstein, P.L.C.

(57) ABSTRACT

A photoelectronic sensor collectively adjusts the light emission intensity of plural light emitting elements and the light reception sensitivity of plural light receiving elements automatically or manually. In order to collectively adjust the light emission intensity of plural light emitting elements and the light reception sensitivity of single light receiving elements automatically, a photoelectronic sensor is configured such that constant current light emission signals are applied to the light emitting elements. Additionally, a light amount of the environment is measured by the light receiving elements and stored, and a reflection light amount from a body to be measured is stored. Furthermore, signal intensities indicating the respective light amounts are calculated, and optimal thresholds of light emission intensity and light reception sensitivity are provided automatically or manually, so that setting of sensor sensitivity is performed.

3 Claims, 32 Drawing Sheets

Light receiving device failure

PHOTOELECTRONIC SENSOR SYSTEM HAVING AUTO-ADJUSTMENT FUNCTION

BACKGROUND OF THE INVENTION

1. Field of the Invention

The present invention relates to a photoelectronic sensor system which is provided with a sensor section including a light emitting element emitting a light emission signal and a light receiving element receiving a reflection signal obtained by reflecting the light emission signal from the light emitting element by a body to be detected or a transmission signal obtained by transmitting the light emission signal through the body to be detected, where the reflection signal obtained by reflecting the light emission signal by the body to be detected or the transmission signal obtained by transmitting the light emission signal by the body to be detected is captured by the light receiving element so that presence/absence of the body to be detected is detected.

2. Description of the Related Art

Conventionally, in storage or management of articles, detecting presence/absence of the articles or a storage position thereof is important for managing the storage number of the articles or a storage place or a storage position thereof at the so-called cell production step such as a manufacturing step of the articles, a manufacturing step of products using these articles or an assembling step thereof, or an inspecting step or at a use time of these articles. Since management information about the storage number, the storage place, or the storage position is transmitted to a host system or an automated machine at the next step so that automation of a manufacturing line or an inspection line, or a step in storage and management can be realized, photoelectronic sensors or the like are used. For example, in production of glasses for liquid crystal, glass plates for a disk, printed boards, or semiconductor substrate wafers, photoelectronic sensors are used for detecting a residence site of a wafer cassette or articles on a storage shelf, or presence/absence of articles.

Alternatively, in storage and management of regular articles or regular apparatuses, photoelectronic sensors are used for detecting presence/absence of the articles or the apparatuses, or a storage position thereof.

For example, Patent Literature 1 describes a photoelectronic sensor where light emission signal is guided from a light emitting element to a light emitting window by an optical fiber for light emission, the light emission signal emitted from the light emitting window is guided to a light receiving element through an optical fiber for light reception as light reception signal, and presence of a wafer is detected based upon blocking of the light emission signal performed by a wafer which is a body to be detected. However in this case, using of the optical fiber intervening in the light emitting element or the light receiving element attenuates light emission signal or light reception signal due to taking-in or a transmission distance of the light from the light emitting element, which results in such a problem that light emission with high luminance or light reception with high luminance cannot be achieved efficiently. That is, such a problem is included that reflection at a light taking-in portion of an optical fiber or attenuation of light due to an optical fiber makes effective utilization of an optical signal difficult and blocks improvement of sensitivity of a photoelectronic sensor. There is a problem that it is necessary to perform luminance adjustment of each of a plurality of light emitting elements or perform light reception sensitivity adjustment of each of a plurality of light receiving elements, which requires time and labor for adjustment, and readjustment is required due to change of environment according to installation or disturbance, so that complicated adjusting work is required. When the photoelectronic sensors are generally used for detecting a plurality of bodied to be detected, a bundle of optical fibers from a plurality of detecting units or a bundle of signal wires delivering signals from the detecting units to a control system causes a problem about size reduction or handling of the bundles, the detecting units must be adjusted individually, and works such as a rising adjustment work or adjustment work at a changing time of an installation place of the detecting units are complicated.

Patent Literature 1: Japanese Patent No. 2874020

SUMMARY OF THE INVENTION

In an art disclosed in Patent Literature 1, the abovementioned problem occurs when light with high luminance is directly emitted toward a body to be detected or light is directly received from the body to be detected with high sensitivity without including a distance therebetween to detect. Further, there is such a problem that luminance adjustment of the light emitting device and light reception sensitivity adjustment of the light receiving device must be performed for each set of light emission and light reception, but the present invention has solved such a complicated work.

Namely, an object of the present invention is, for the purpose of eliminating the complicated work for adjustments of respective circuits inherent to such a conventional configuration, to perform stable light emission and light reception, to simplify light receipt function adjustment, and to achieve automation of adjustment of a photoelectronic sensor unit.

Another object of the present invention is to allow luminance adjustment of a plurality of light emitting circuits or sensitive adjustment of a plurality of light receiving circuits and solve a problem about malfunction due to environmental change or light noises.

In order to achieve the above objects, the present invention is configured such that adjusting luminance or sensitivity of a system comprising single or plural photoelectronic sensors, and adjusting a threshold to realize determination about luminance adjustment or gain adjustment corresponding to surrounding circumstances of installation of a photoelectronic sensor can be set collectively.

A photoelectronic sensor according to the present invention is comprised a child station input/output section, a sensor control section, and a sensor section, and connected to a parent station which transmits and receives a monitoring signal and a control signal as parallel signals to a control section by a transmission line.

The child station input/output section acquires a control signal directed to a station including the child station input/output section and included in serial transmission signals transmitted through the transmission line to perform control output to the sensor section and feed a monitoring signal to the transmission line as a detection result of the sensor section.

The sensor section includes one pair or plural pairs of a light emitting device and a light receiving device.

The sensor control section is disposed between the child station input/output section and the sensor section and comprises an A/D converter (an analog to digital converter), a storage element, a microprocessor unit (an MPU), a luminance adjusting circuit, a detection driving circuit, and a detecting circuit.

The A/D converter converts analog signal detected by the sensor section to digital signal data.

The storage element stores and holds the digital signal data from the A/D converter.

The MPU performs arithmetic processing or determination of the detection state based upon storage data stored in the storage element.

The luminance adjusting circuit generates a driving clock pulse signal driving the light emitting device in a time divisional manner by the control signal or according to a determination result of the MPU.

The detection driving circuit detects light reception signal intensity level of the light receiving device.

The light reception level date at a non light emission time of the light emitting device is stored as low light amount level data, and presence/absence of a body to be detected is determined based upon a difference obtained by subtracting the low light amount level data from light reception level data at a light emission time from the light emitting device.

Drive of the light emitting device may be controlled by constant current pulse corresponding to the drive clock pulse signal.

The light reception level data may be compared with comparison setting value set for comparison in advance, whereby sensitivity shortage is specified.

The light reception level data may be compared with the light reception level data of another light reception circuit at own station, whereby sensitivity shortage is specified When sensitivity shortage is specified, luminance adjustment may be performed, and when the luminance adjustment exceeds an adjustment range, a gain of light reception signal may be gain-adjusted.

When the sensitivity shortage is specified, a gain of a light reception signal may be gain-adjusted, and if the luminance adjustment exceeds an adjustment range in that case, luminance adjustment may be performed.

An intermediate value obtained by subtracting the low light amount level data from the light reception level data of receiving the light emission signal at a light emission time may be used as a threshold and determination about whether the value obtained by the subtraction is higher than the threshold or lower than the threshold may be made.

A value obtained by multiplying an intermediate value between the light reception level data when the light emission signal is received and the low light amount level data by a coefficient may be set as a threshold, and whether the difference is above or below the threshold may be determined.

An initial value of the threshold value may be read from ROM data or externally, and the threshold may be sequentially updated based upon the light reception level data obtained when presence/absence of the body to be detected has been detected.

When the threshold is lower than a level stored in advance gain-adjustment may be performed for performing adjustment to a proper threshold is provided.

When the light reception level when the light emission signal is received is lowered to a predetermined level based upon stored data at a time when the luminance adjustment or gain adjustment has been completed, degradation of the light emitting device, degradation of the light receiving device, or loss of transparency of the sensor section may be determined so that a failure detection signal may be generated.

When the low light amount level data is higher in level as compared with a disturbance light abnormality value stored when the luminance adjustment and/or gain adjustment has been completed, an error signal may be outputted as detection of disturbance light.

When the light reception level data at a light emission time of the light emitting device is higher in level as compared with a predetermined superposition detection value, it may be determined that a plurality of bodies to be detected superposes with one another.

The photoelectronic sensor system according to the present invention provided with a plurality of the photoelectronic sensor according to the present invention mentioned above.

According to the photoelectronic sensor of the present invention, since a plurality of photoelectronic sensors can be adjusted collectively, rising adjustment, inspection adjustment, adjustment after exchange for failure, or the like can be performed extremely easily.

Further, according to the present invention, adjustment works such as initial setting of a plurality of photoelectronic sensors, periodic inspection adjustment performed thereafter, or adjustment performed at an environmental change time can be simplified, the photoelectronic sensors are hardly influenced by environment, confirmation about a factor at failure can be easily made.

DETAILED DESCRIPTION OF THE PREFERRED EMBODIMENTS

A photoelectronic sensor according to the present invention will be explained below based upon an embodiment with reference to the drawings.

Regarding a photoelectronic sensor according to the present invention, the embodiment will be explained with reference to FIG. 1 to FIG. 31.

Figure 1:
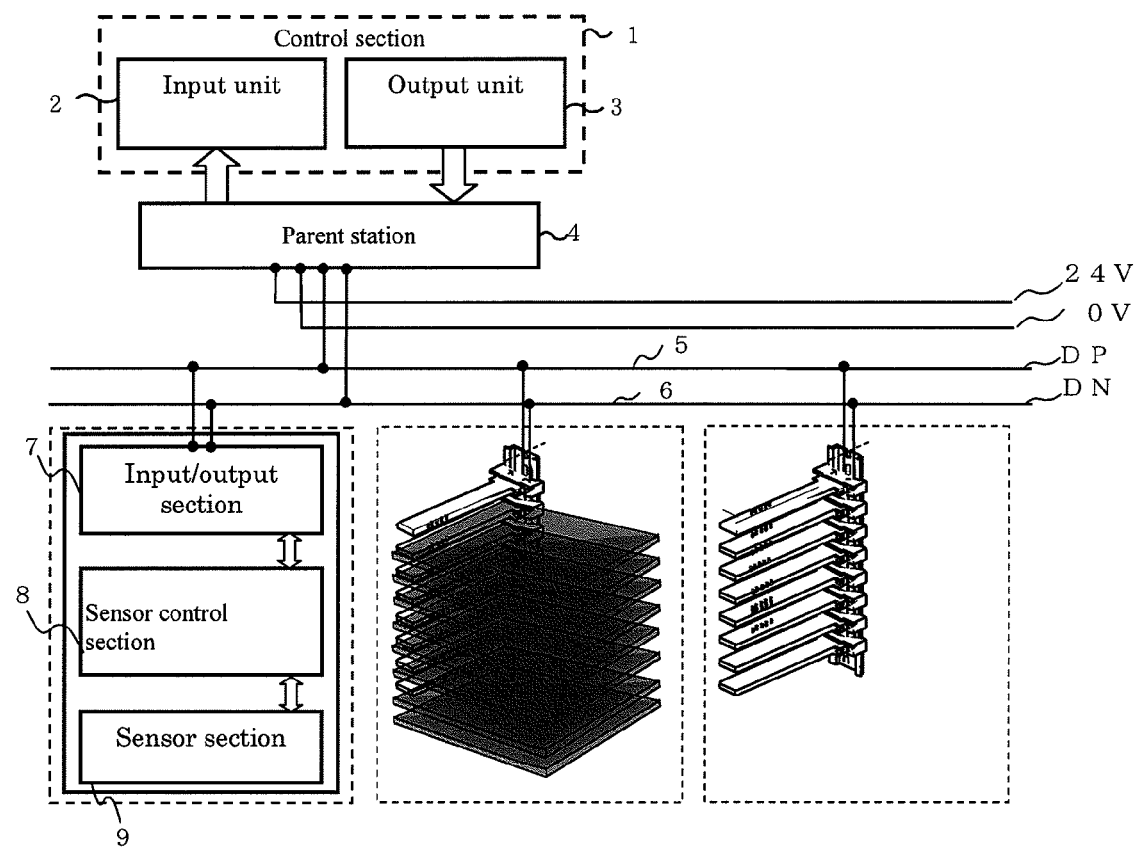
FIG. 1 is a configuration diagram showing an embodiment of a photoelectronic sensor system where photoelectronic sensors according to the present invention is used.

FIG. 1 is a configuration diagram showing an embodiment of a photoelectronic sensor system where photoelectronic sensors according to the present invention is used.

In the photoelectronic sensor system showen in FIG. 1, a child station configuring a region sensor of an interruption type is connected to transmission lines (a DP signal line 5 and a DN signal line 6), whereby communication control of the child station is performed through a parent station 4.

Two transmission lines (the DP signal line 5 and the DN signal line 6) are arranged between the parent station 4 and the child station 10 which is the photoelectronic sensor of the photoelectronic sensor system, where a plurality of child stations 10 can be connected in parallel easily. Presence/absence of a body to be detected 11 is detected by a sensor section 9, a detection signal is transmitted to a sensor control section 8, and a result of signal processing performed by the sensor control section 8 is transmitted from a child station input/output section 7 to the parent station 4 through the transmission lines (the DP signal line 5 and the DN signal line 6). The parent station 4 transmits information about presence/absence of a body to be detected 11 to an input unit 2 of a control section 1 based on the transmission signal, and the photoelectronic sensor system performs system control according to the information about presence/absence of the body to be detected 11. An output unit 3 of the control section 1 can control behavior of the child station 10 via the parent station 4 properly.

Figure 2:
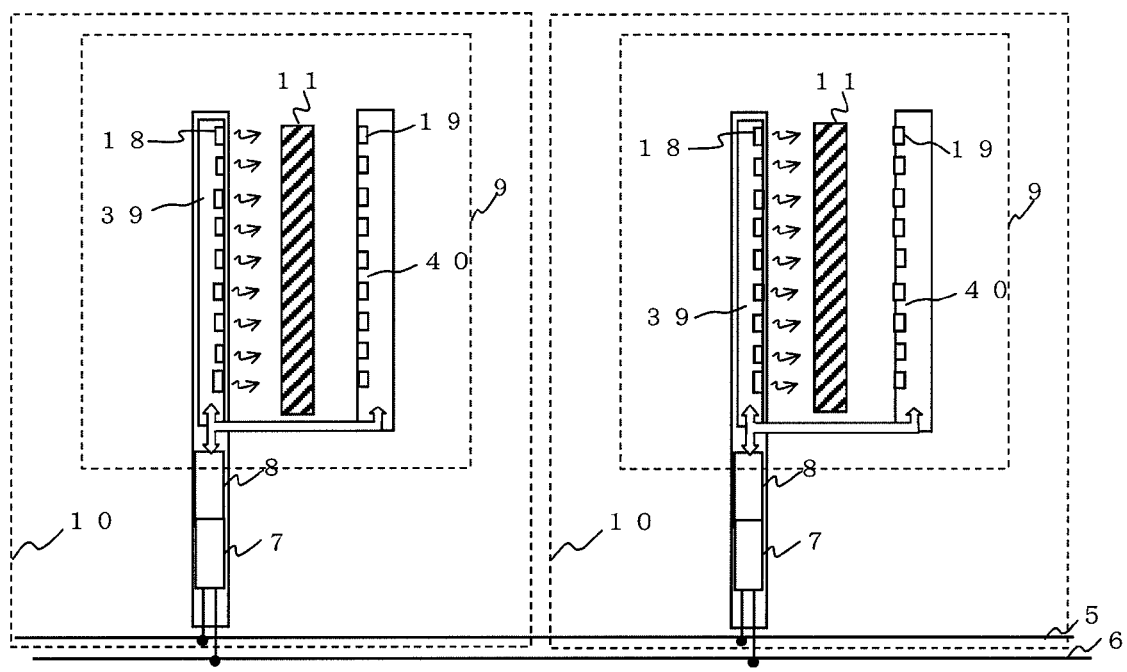
FIG. 2 is an illustrative diagram of a child station which is an interruption type sensor.

FIG. 2 is an illustrative diagram of the child station 10 which is the interruption type sensor.

The control section 1 and the parent station 4 transmits and receives signals each other through parallel signals, while serial signals are transmitted and received between the parent station 4 and the child station 10 through the DP signal line 5 and the DN signal line 6. The child station 10 transmits and receives information about presence/absence of a body to be detected based upon a detection signal from the sensor section 9 via the DP signal line 5, the DN signal line 6, and the child station input/output section 7 through the sensor control section 8.

A configuration of the interruption type sensor shown in FIG. 2 is efficient in application to a case that a distance between a light emitting section 39 provided with a plurality of light emitting devices 18 and a light receiving section 40 provided with a plurality of light receiving devices 19 is relatively short.

Figure 8:
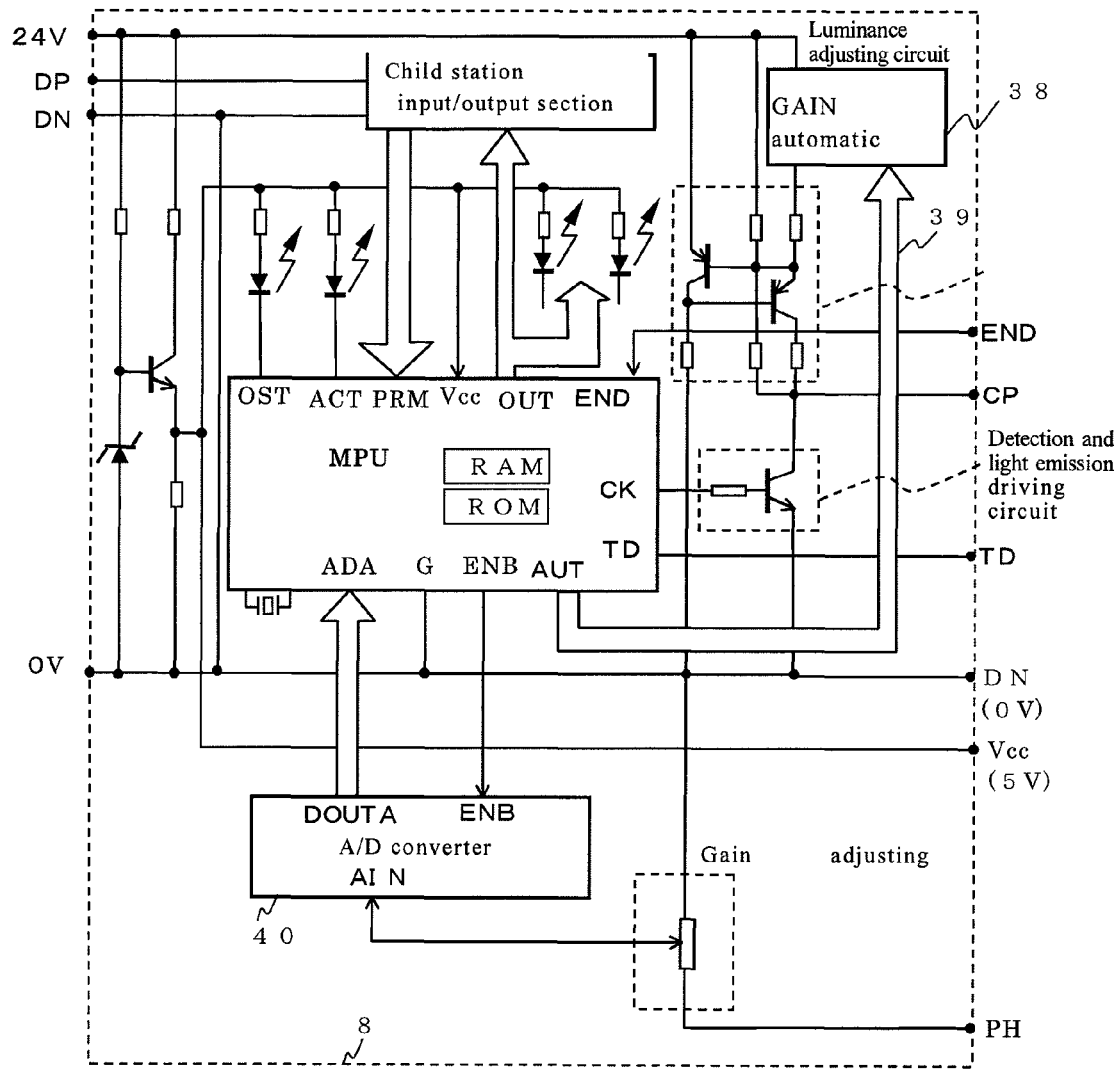
FIG. 8 is a block wiring diagram of another embodiment of a child station input/output section and a sensor control section including a luminance automatic adjusting function of the sensor control section.

Here, the sensor control section 8 and the child station input/output section 7 are configured as shown in FIG. 8. That is, since the light emitting device 18 and the light receiving device 19 share the child station input/output section 7 and the sensor control section 8, simplification and cost reduction of the child station 10 can be achieved.

Figure 3:
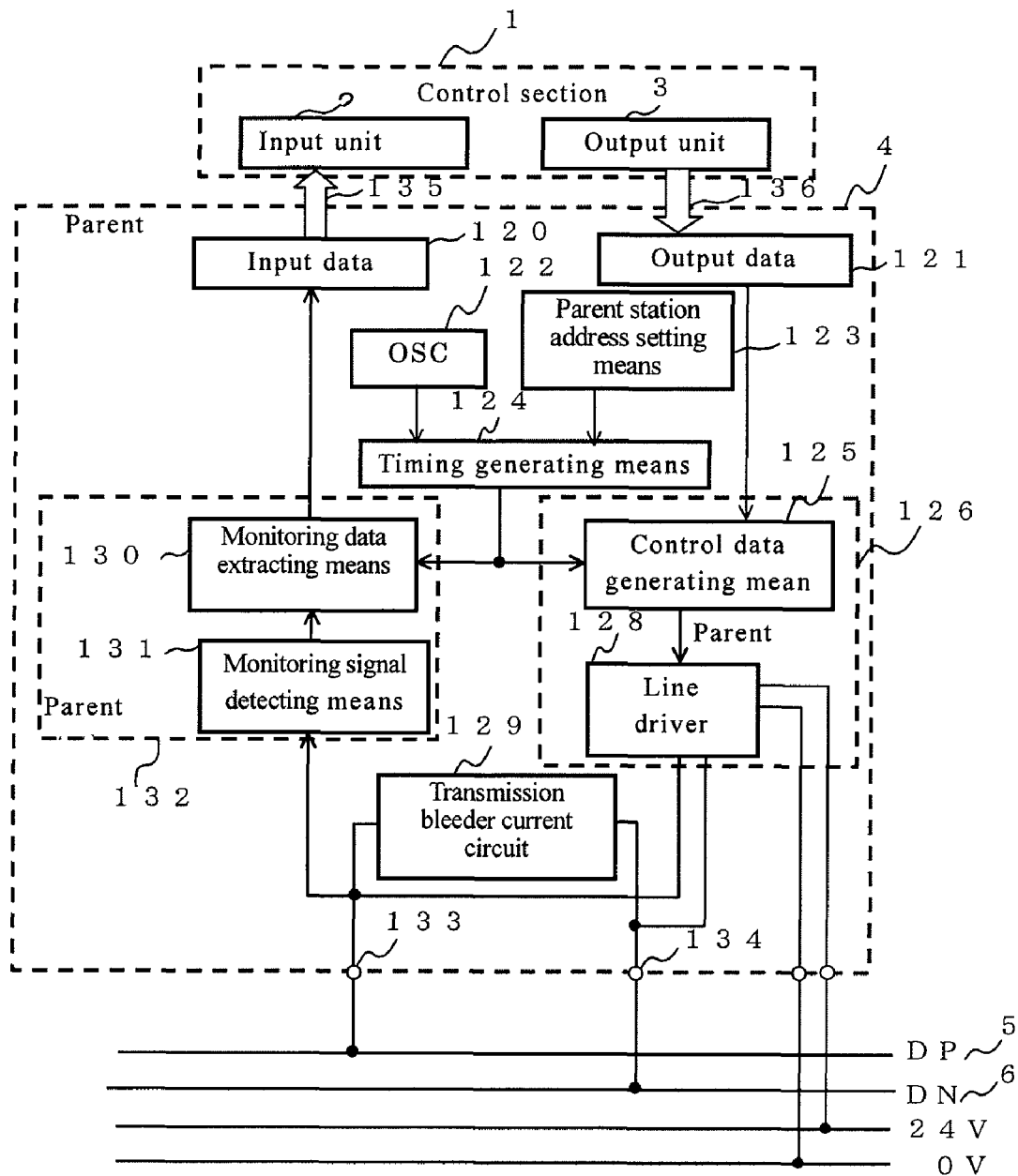
FIG. 3 is a function block diagram of a parent station

FIG. 3 is a function block diagram of a parent station.

The parent station 4 comprises an input data section 120 which performs parallel to serial conversion of serial signals received from the child station 10 to transmit the same to the input unit 2 of the control section 1 as a control input signal 135, an output data section 121 which performs parallel to serial conversion of parallel signals received as a control output signal 136 from the output unit 3 of the control section 1 to take the same therein, a timing generating means 124, control data generating means 125, and a parent station output section 126. The timing generating means 124 receives a basic signal for a clock signal from a crystal oscillation circuit 122 to generate a clock signal and adds a start signal and an end signal to the clock signal to generate a basic signal for a control signal not shown in Figure.

Transmission and reception timings of data of a parent station 4 is transmitted from parent station address setting means 123 to the timing generating means 124. The parent station output section 126 comprises control data generating means 125 and a line driver 128, and it receives power supply from a DC 24V power source 9 and a 0 V power source 10 to supply power to a whole system through a DP signal line 5 and a DN signal line 6.

A parent station input section 132 of the parent station 4 comprises monitoring signal detecting means 131 and monitoring data extracting means 130, and it transmits input data signal to the input data section 120. The monitoring signal detecting means 131 detects data signals which are monitoring signals obtained from the child station 10 via the DP data signal line 5 and the DN data signal line 6. The parent station 4 includes a transmission bleeder current circuit 129 serving as a transmission interface circuit.

The transmission bleeder current circuit 129 which is the interface circuit is connected to a line driver 128 within the parent station output section 126 and the parent station 4 transmits control data received from the control data generating means 125 of the parent station 4 together with a clock signal transmitted from the timing generating means 124 to the DP signal line 5 via an external signal connection section (DP side) 133 and to the DN signal line 6 via an external signal connection section (DN side) 134.

The line driver 128 delivers data signal to the monitoring signal detecting means 131 of the parent station input section 132 and the monitoring data extracting means 130 obtains monitoring data signal in synchronism with a clock signal received from the timing generating means 124. The line driver 128 delivers the monitoring data signal to the input data section 120 to transmit the same to the input unit 2 of the control section 1 as a parent station transmission signal 135.

Thus, the parent station 4 is positioned between the control section 1 and the child station 10, and it functions to receive child station information and deliver the signal to the control section and receive control signal from the control section to deliver the same to the child station 10.

Figure 4:
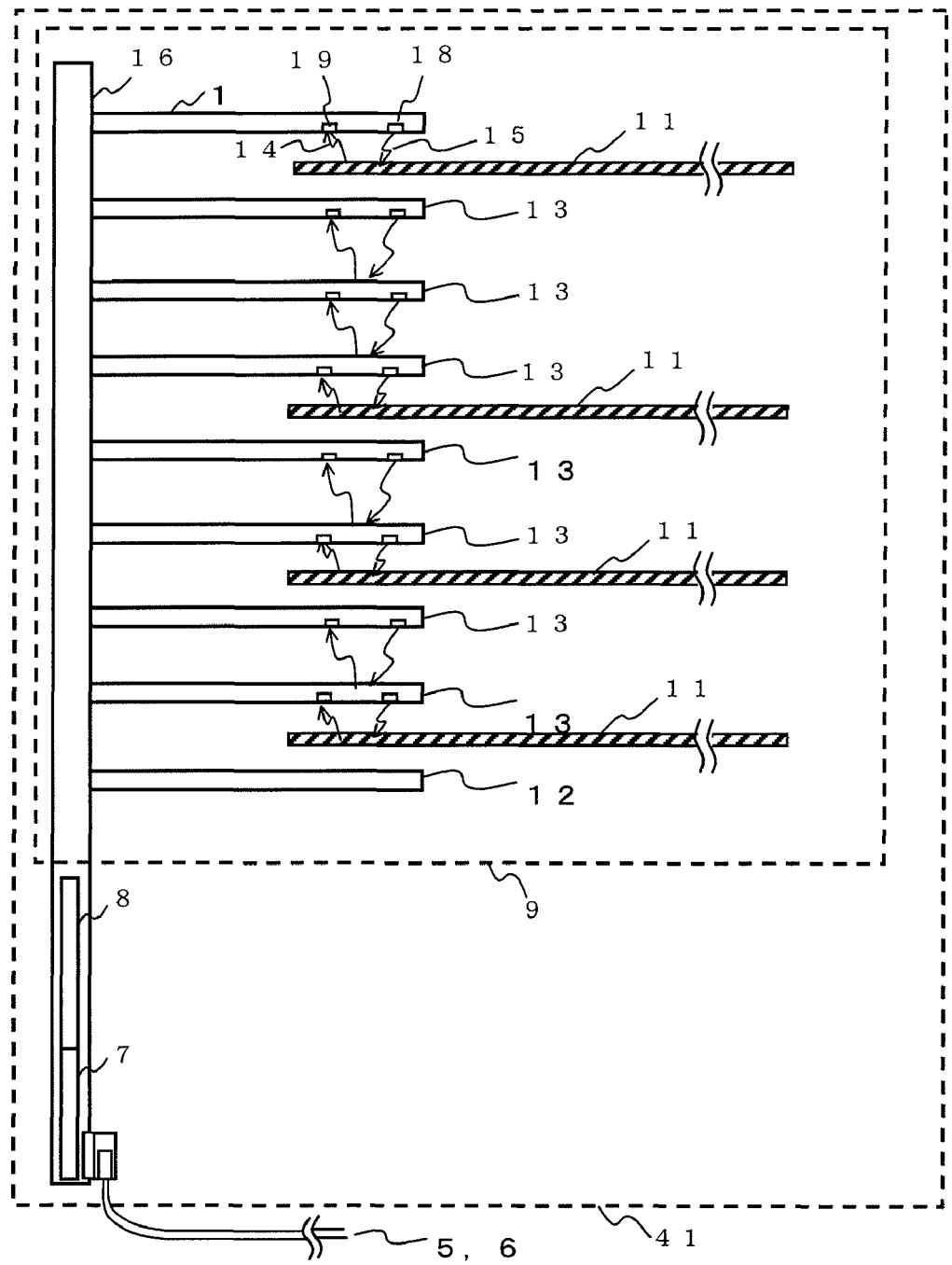
FIG. 4 is a side illustrative diagram of the interruption type sensor.

FIG. 4 is a side face illustrative diagram of the interruption type sensor.

The reflection type sensor 41 which is an embodiment of a photoelectronic sensor of the present invention transmits and receives information between the same and the parent station 4 through the DP signal line 5 and the DN signal line 6 utilizing a serial signal. The child station input/output section 7 serves as an interface with the DP signal line 5 and the DN signal line 6 to receive information about presence/absence of the body to be detected 11 which is detected by the sensor section 9 via the sensor control section 8 and transmit the same to the parent station 4 via the DP signal line 5 and the DN signal line 6. A plurality of sensor combs 13 attached to an attaching plate 16 emit light emission signals 15 toward the bodies to be detected 11 and receive reflection signals from the bodies to be detected 11 to detect presence/absence of bodies to be detected 11 as light reception signals 14.

A dummy comb 12 is provided for setting a detection limit when no body to be detected 11 is present.

Figure 5:
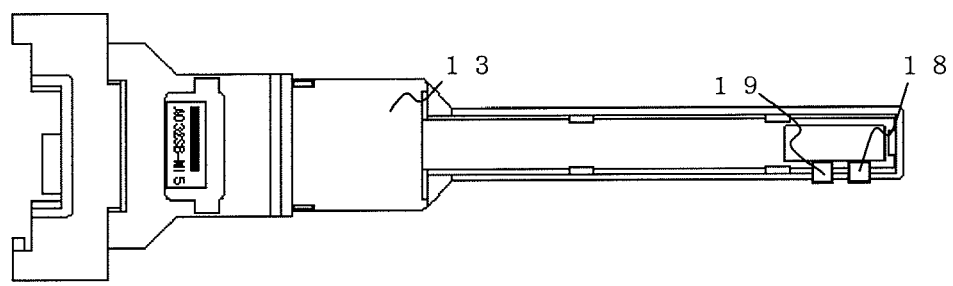
FIG. 5 is a plan view of a sensor comb.

FIG. 5 is a plan view of a sensor comb. Such a structure is adopted that a light emitting element 18 and a light receiving element 19 are provided at a distal end of the sensor comb 13 and an upper face of an end portion of a body to be detected 11 whose both ends are supported like a shelf and held in a multi-stage manner is detected, and a light emission signal from the light emitting element 18 is reflected by the upper face of the end portion of the body to be detected 11 and the reflection light is received by the light receiving element 19 so that presence of the body to be detected 11 is detected.

Figure 6:
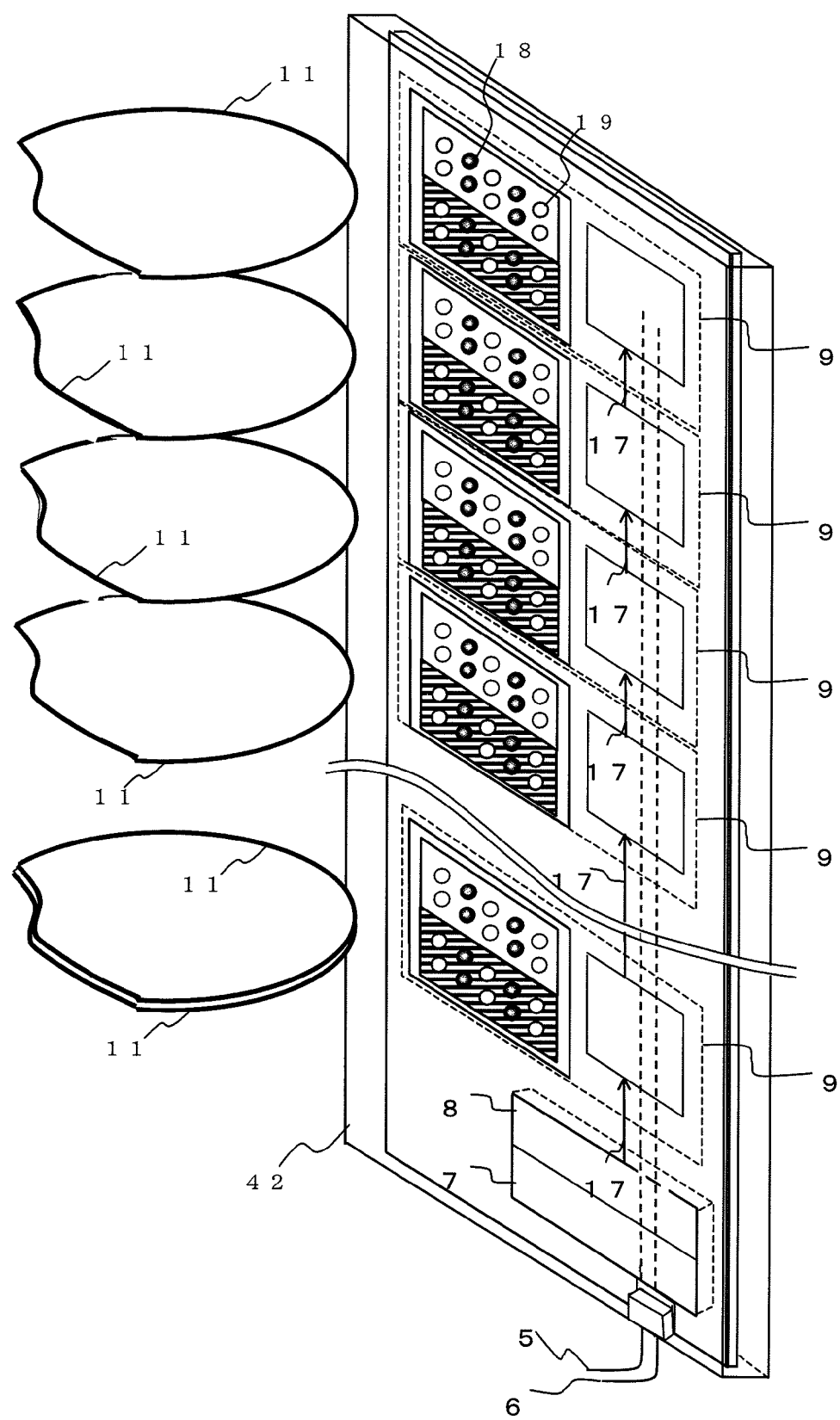
FIG. 6 is an illustrative diagram showing a state where detecting end portions of bodied is detected.

FIG. 6 is an illustrative diagram showing a state wherein an end portion of a body to be detected is detected.

The body to be detected 11 is a plate-like body such as a semiconductor wafer, a liquid crystal glass, or a printed board, where a light emission signal from a light emitting element 18 is hit on an end portion of the body to be detected 11, and the reflection light is received by the light receiving element 19 so that presence/absence of the body to be detected 11 is detected. A detection signal is transmitted from the sensor section 9 to the sensor control section 8, and after it is subjected to signal analysis, it is transmitted from the child station input/output section 7 to the parent station 4 through the DP signal line 5 and the DN signal line 6 as a presence/absence signal of the body to be detected 11. In FIG. 6, two bodies to be detected 11 which are circular wafers and positioned on a lowermost stage are stored in a stacked state to each other, and such an abnormal state is detected by a light reception signal shown in FIG. 21.

Figure 7:
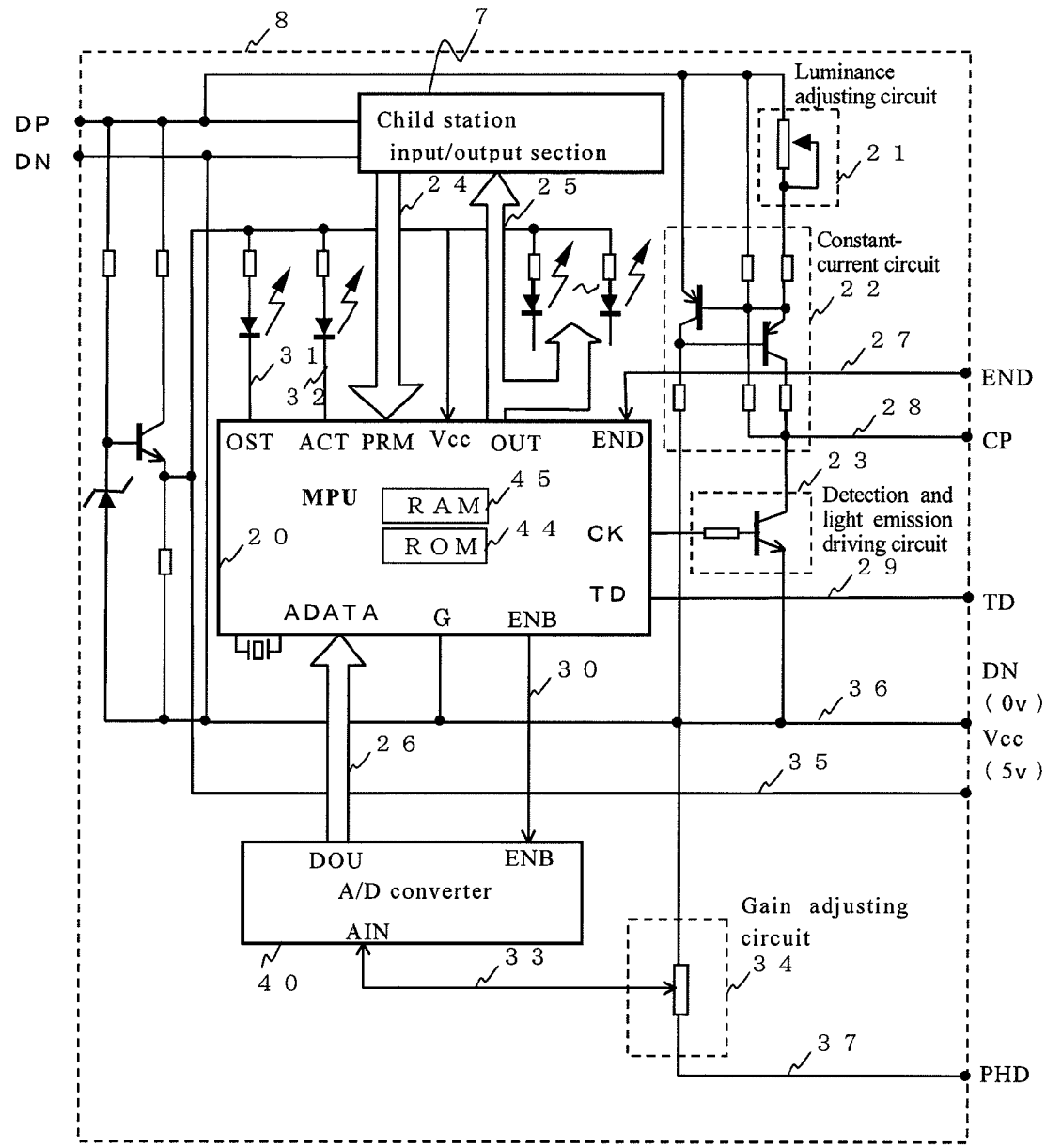
FIG. 7 is a function block wiring diagram of a child station input/output section and a sensor control section.

FIG. 7 is a function block wiring diagram of the child station input/output section 7 and the sensor control section 8. The child station input/output section 7 transmits and receives signals transmitted on the DP signal line 5 and the DN signal line 6. On the other hand, the child station input/output section 7 receive an OUT signal 25 from MPU 20, so that a detection result of the body to be detected 11 which has been determined by the MPU 20 basing upon the detection signal from the sensor section 9 is transmitted to the parent station 4. The child station input/output section 7 transmits a signal directed from the parent station 4 to the sensor control section 8 to the MPU 20 as PRM signal 24.

Transmissions of signal from the sensor control section 8 to the light emitting section 39 of the sensor section 9 and power supply are performed through connection of five lines of CP signal 28, END signal 27, TD signal 29 which is timing data signal, a power supply line Vcc (5V) 35, and DN (0V) 36 which are shown in FIG. 7. Transmission of signal from the light receiving section 40 of the sensor section 9 and power supply are performed through connection of five lines of the power supply line Vcc (5V) 35, the DN (0V) 36, the CP signal 28, the TD signal 29 which is the timing data signal, and a PHD 37 which are shown in FIG. 7.

The sensor control section 8 is provided with the MPU 20 serving as a central function, ROM 44 storing and holding comparison data and determination program data, RAM 45 storing and holding sensor level data and arithmetic result, a luminance adjusting circuit 21 performing luminance adjustment for light emission signal, a constant-current circuit 22 for suppressing fluctuation of light emission signal to perform stable light emission, a detection and light emission driving circuit 23 superposing driving current of the light emitting device on CP signal 28 to transmit the same, an A/D converter 40, and a gain adjusting circuit 34.

Since light emission currents of the light emitting devices can be suppressed to a constant value by using the constant-current circuit 22, lights can be evenly emitted from the respective light emitting devices, which can result in easiness of setting.

The sensor control section 8 receives the PHD signal 37 obtained by superposing light reception end signal on signal received from the light emitting device 48 of the light emitting section from the light receiving section 40 of the sensor section 9, adjusts gain of the PHD signal 37 at the gain adjusting circuit 34, converts AIN signal 33 which is analog signal to a digital level signal at the A/D converter 40, and it takes the digital level signal into an ADATA port of the MPU 20 as DOUTA signal 26. Data conversion timing at the A/D converter 40 is controlled by an ENB signal 30 which is enable signal enabling A/D conversion by the MPU 20.

In the sensor control section 8, CK signal 43 serving as a basic signal for light emission or light reception is transmitted from the MPU 20 toward the sensor section 9.

FIG. 8 is a block wiring diagram of another embodiment of the child station input/output section 7 and the sensor control section 8 including a luminance automatic adjusting function of the sensor control section 8. In FIG. 8, the sensor control section 8 has such a configuration that the luminance adjusting circuit 21 shown in FIG. 7 is replaced by a luminance automatic adjusting circuit 38 and AUT signal 39 is added as luminance automatic adjusting signal.

When the MPU 20 detects lowering of a light reception signal due to luminance shortage, it transmits AUT signal 39 which is luminance automatic adjusting signal to the luminance automatic adjusting circuit 38 for adjustment of a light reception signal to perform luminance automatic adjusting behavior. The light emitting device is connected to a constant-current source to emit light, and sensitivity variations inherent to a light receiving elements, variations of directionalities of lights from the light emitting devices, or the like can be made even by the luminance automatic adjusting function.

Further, the sensor control section 8 is provided with an A/D converter 40, so that luminance adjustment of the light emitting device, light reception sensitivity adjustment, and accurate adjustment based upon feedback of data at an offset signal adjustment time can be performed.

Figure 9:
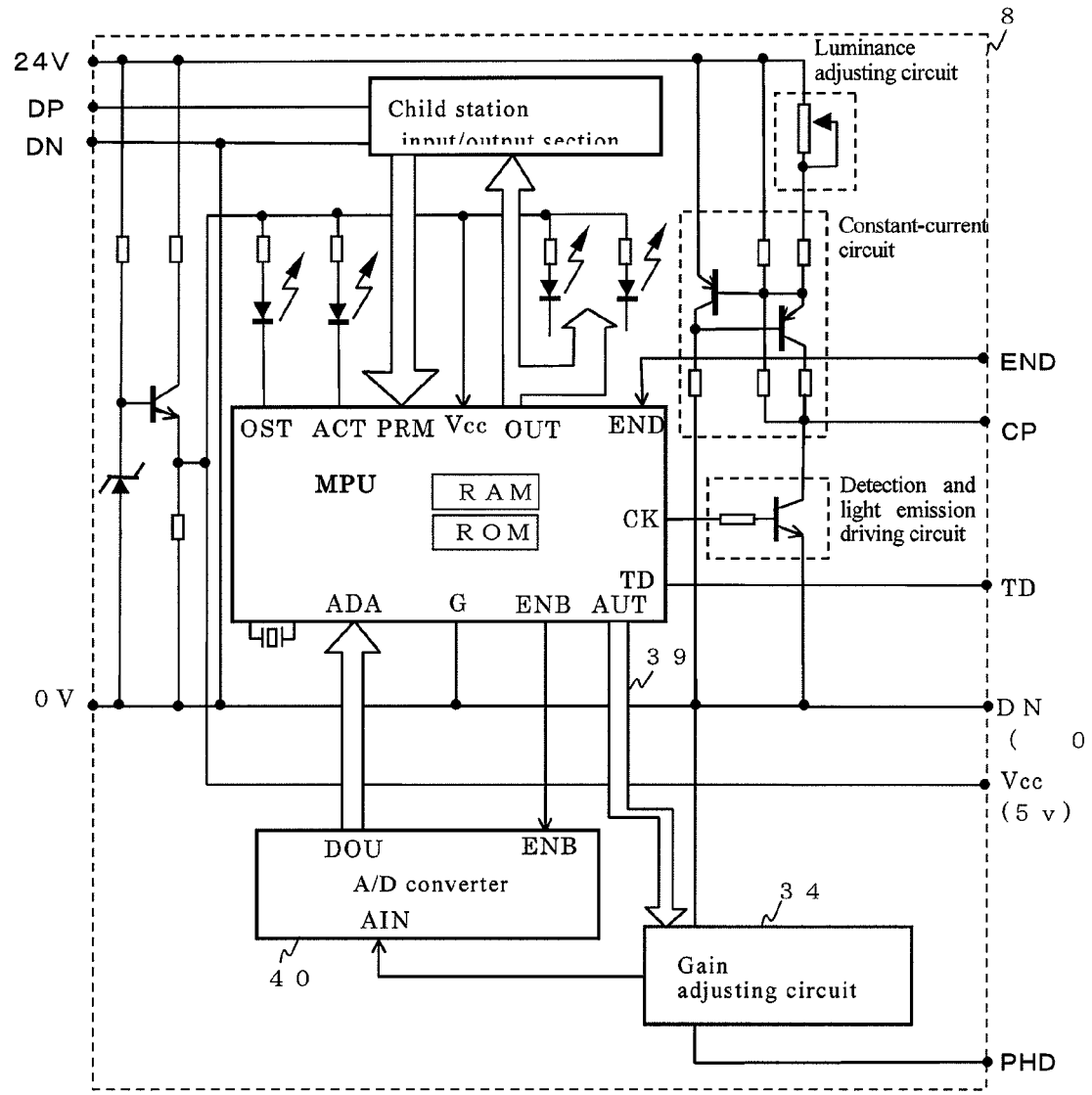
FIG. 9 is a block wiring diagram of other embodiment of a child station input/output section and a sensor control section including a GAIN adjusting function of the sensor control section.

FIG. 9 is a block wiring diagram of other embodiment of the child station input/output section 7 and the sensor control section 8 including GAIN adjusting function of the sensor control section. In FIG. 9, the sensor control section 8 has such a configuration that the GAIN adjusting circuit 34 shown in FIG. 7 is replaced by a GAIN automatic adjusting circuit 34 and AUT signal 39 is added as a GAIN automatic adjusting signal.

When the MPU 20 detects lowering of light reception signal due to gain shortage, it transmits AUT signal 39 which is GAIN automatic adjusting signal to the GAIN adjusting circuit 34 for adjustment of light reception signal to perform GAIN adjusting behavior automatically. The light reception signal which has been automatically GAIN-adjusted is converted from analog data signal to digital data signal by the A/D converter 40 to be transmitted to the MPU 20. In FIG. 9, the child station input/output section transmits a signal to the control section via the parent station 4 through the DP signal line 5 and the DN signal line 6, but a high-speed photoelectronic sensor system can be established by directly connecting parallel signal to a parallel port of the control section without using a serial signal line shown in FIG. 9 and without passing through the parent station.

Figure 10:
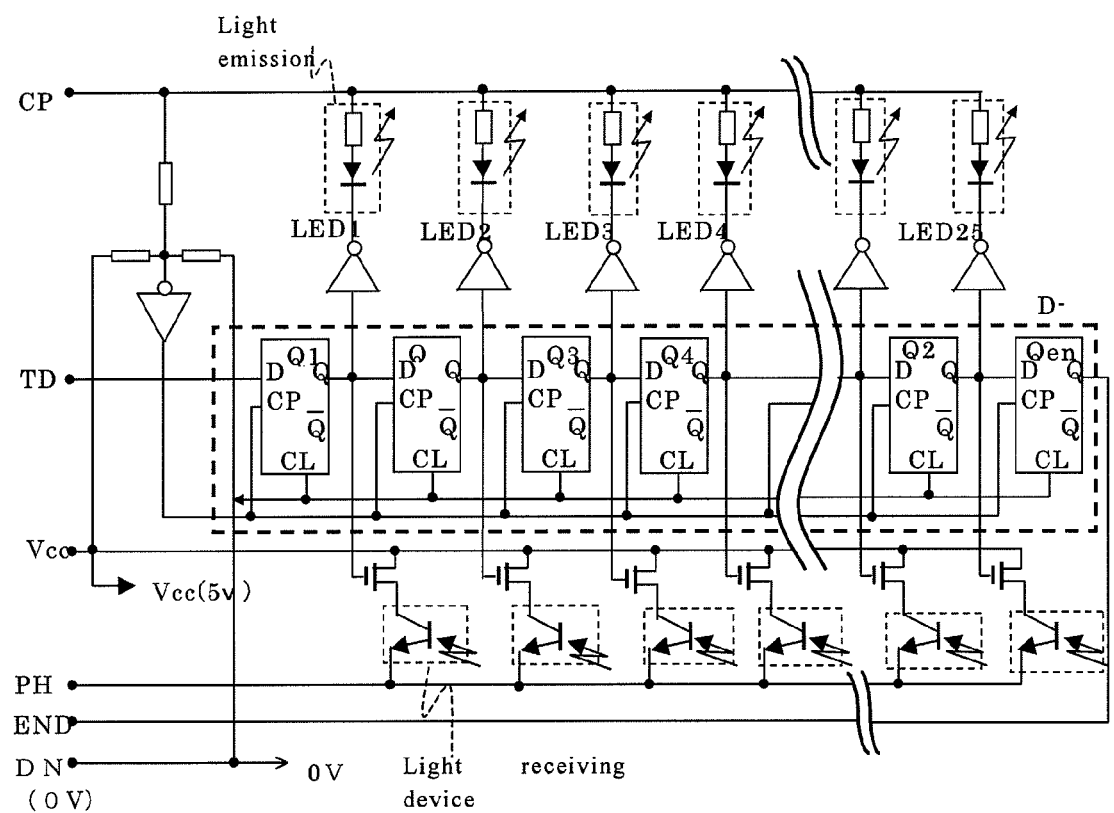
FIG. 10 is a function block wiring diagram of a sensor section.

FIG. 10 is a function block wiring diagram of the sensor section.

A clock signal generated at the parent station 4 is transmitted to the sensor section via the sensor control section 8 as clock pulse (CP) signal 28. At the clock pulse (CP) signal 28, a pulse whose duty cycle is longer than that of an ordinary clock pulse is used for a start signal, so that it is discriminated from an ordinary clock. The clock pulse (CP) signal 28 is pulse signal positioned between 0V and 24V in voltage level. 0V 36 and Vcc 35 are connected as a power source for the sensor section. A plurality of light emitting elements in the sensor section are driven by shift registers and drive of the first shift register is actuated by TD signal 29.

Shift signal for the final shift register is returned to the sensor control section 8 as END signal 27, so that behaviors of light emission and light reception configuring a pair are completed and behaviors of light emission and light reception of light emitting device and light receiving device configuring the first pair are started.

In the sensor section, the light receiving device receives PHD signal 37 which is light reception signal to transmit it to the sensor control section 8 regardless of non light emission time and light emission time of the light emitting device.

Figure 11:
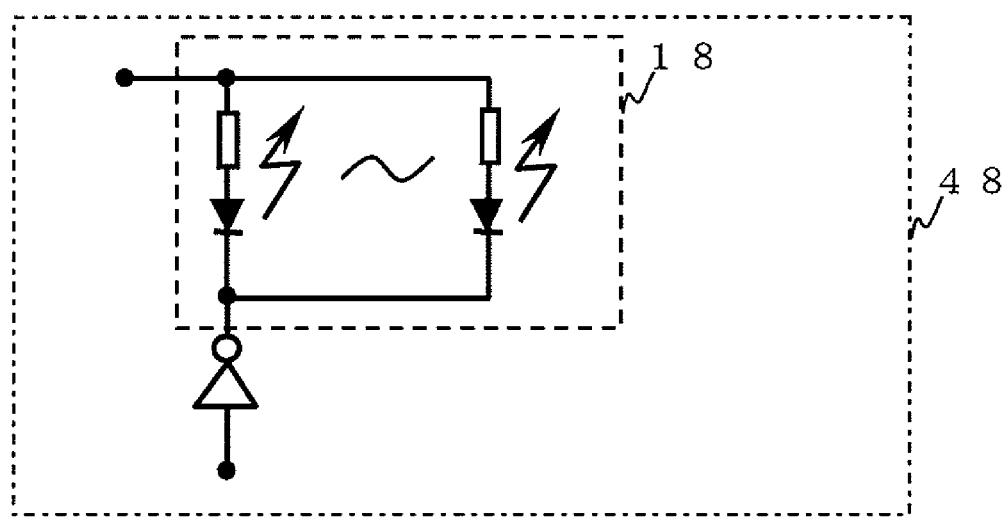
FIG. 11 is a wiring diagram of a light emitting device.

FIG. 11 is a wiring diagram of the light emitting device.

A light emitting device 48 comprises single or plural light emitting elements 18 and the number of light emitting elements and arrangement thereof are devised so as to adjust illuminance and a light emission area properly according to a use condition.

Figure 12:
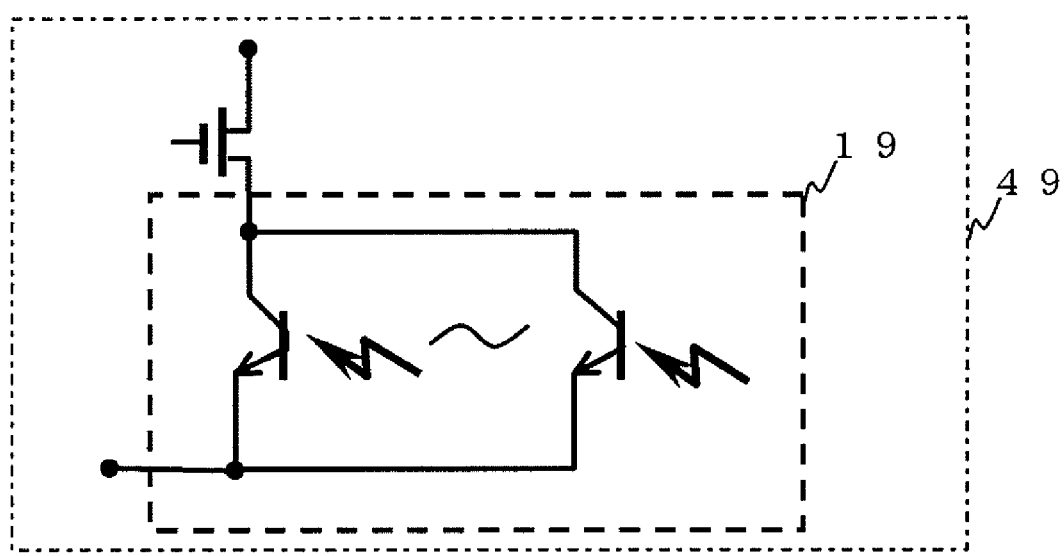
FIG. 12 is a wiring diagram of a light receiving device.

FIG. 12 is a wiring diagram of the light receiving device.

A light receiving device 49 comprises single or plural light receiving elements 19 and the number of light receiving elements and arrangement thereof are devised so as to adjust luminance and a light reception area properly according to a use condition.

Figure 13:
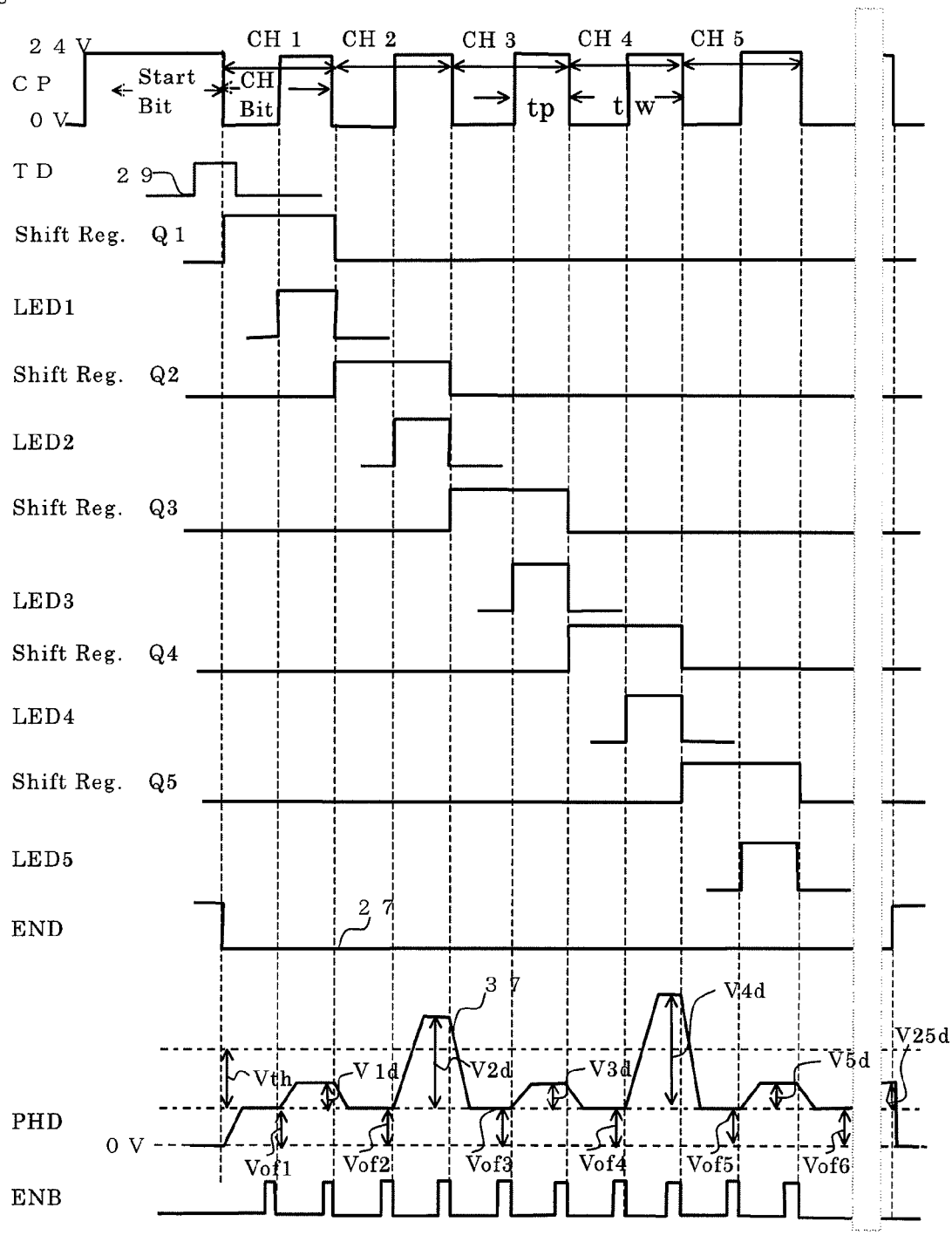
FIG. 13 is a time chart diagram of signals of a child station.

FIG. 13 is a time chart diagram of signals of the child station.

Clock pulse (CP) signal 28 shown in an uppermost stage has a crest value from a signal voltage 0V to 24V. Signal is started from a start bit having a pulse width of 5 times that of an ordinary clock pulse. The start bit is signal for a child station 4 to recognize start of monitoring cycle. After the start bit, pulses corresponding to a plurality of child stations 4 are continued.

The case in FIG. 13 shows an example where one child station corresponds to pulse signal of one bit. According to pulse corresponding to one bit corresponding to one child station, correspondence of input and output of the one child station 4 is obtained.

Next, the TD signal 29 from the sensor control section 8 is transmitted to the sensor section, so that shift register behavior of the sensor section starts.

Output pulse of Shift Reg.Q1 which is behavior pulse of the shift register actuates LED 1 at a timing of channel 1 (CH1) of the clock pulse (CP) signal 28, so that the LED 1 emits light emission signal. The next Shift Reg.Q2 operates at falling of a light emission signal of the CH1 so that output thereof actuates LED2.

Thus, light emission signals are generated according to sequential shift register behaviors.

Shift signal of a shift register at the final stage where a series of shift register behaviors have been completed is returned to the sensor control section 8 as END signal 27, so that light emission and light reception behaviors start from the first stage. Vcc 35 and 0V 36 supply power from the sensor control section 8 as power source of the sensor section.

PHD signal 37 is light reception signal obtained by connecting output signals of a plurality of light receiving elements in parallel. The light reception signal is sent to the sensor control section 8 and the PHD signal 37 which is analog signal is converted to digital light reception level signal by the A/D converter 40 of the sensor control section 8. ENB signal 30 which is conversion timing signal is transmitted from the MPU 20 to the A/D converter 40.

Figure 14:
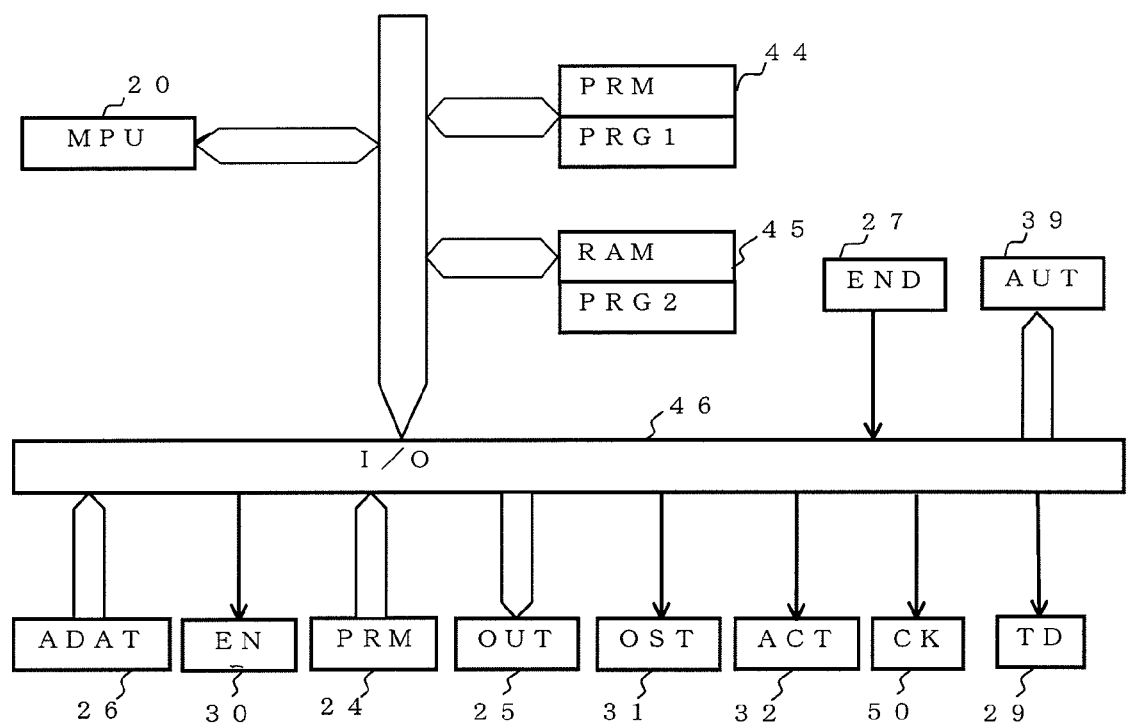
FIG. 14 is a block diagram showing a peripheral circuit configuration of an MPU.

FIG. 14 is a block diagram showing a peripheral circuit configuration of the MPU.

In FIG. 14, the MPU 20 is connected to the ROM 44 and the RAM 45 which are storage elements through a local bus. The END signal 27, the ADAT signal 26, and the PRM signal 24 are inputted to an I/O 46 which is an I/O bus as input signals. ENB signal 30, the OUT signal 25, an OST signal 31, an ACT signal 32, a CK signal 50, the TD signal 29, the AUT signal 39 are outputted from the I/O 46 which is the I/O bus as output signals.

Figure 15:
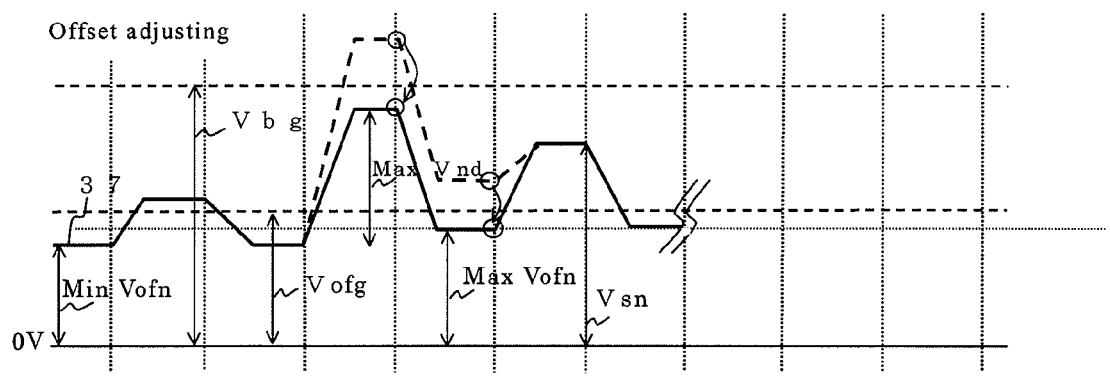
FIG. 15 is a time chart diagram showing an offset adjusting function.

FIG. 15 is a time chart diagram showing an offset adjusting function.

The PHD signal 37 which is light reception signal includes the minimum offset signal Min Vofn and the maximum offset signal Max Vofn to potential of 0V. Set offset signal level Vofg is set from the minimum offset signal Min Vofn and the maximum offset signal Max Vofn. The set offset signal level Vofg is set to be larger than the maximum offset signal Max Vofn to mask fluctuation of the offset signal.

The light reception signal which is the PHD signal 37 shown by a broken line is adjusted such that the maximum light reception signal Max Vnd falls within a set value Vbg. The light reception signal Vsn is more than the set offset signal level Vofg and fluctuates within the set offset set value Vbg.

For determining presence/absence of a body to be detected, noises of light around an outer periphery is removed by removing offset signal component, whereby detecting presence/absence of a body can be detected accurately.

Figure 16:
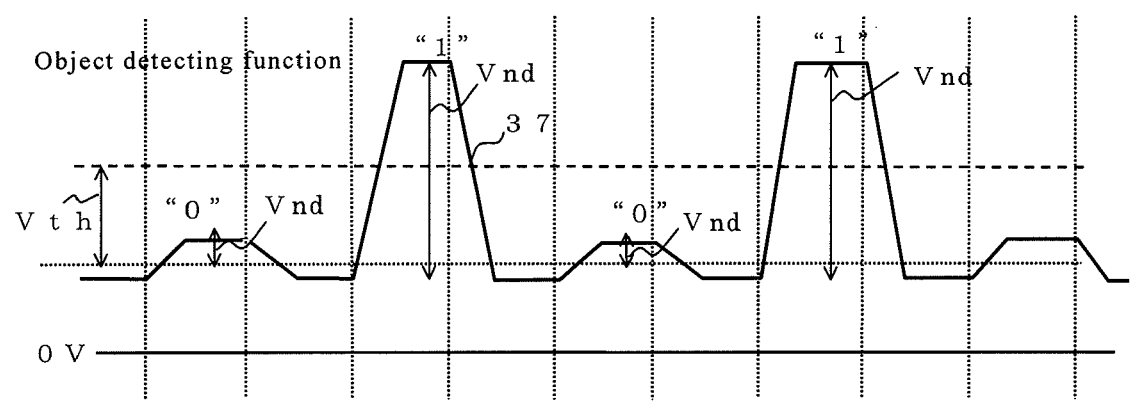
FIG. 16 is a time chart diagram showing an object detecting function.

FIG. 16 is a time chart diagram showing an object detecting function.

In the light reception signal PHD signal 37, light reception signal Vnd obtained when a body to be detected 11 is absent is represented by logical value "0" state, while light reception signal Vnd exceeding a threshold Vth and obtained when a body to be detected 11 is present is represented by logical value "1" state. Here, regarding the threshold Vth, it is an important fact to subtract the set offset signal level Vofg from the light reception signal PHD signal 37 and set the threshold Vth as an intermediate value between the logical value "0" state of the light reception signal Vnd obtained when a body to be detected 11 is absent and the logical value "1" state of the light reception signal Vnd obtained when a body to be detected 11 is present. Then this sensor is characterized in that an offset signal component is calculated using the light reception signal level at a non light emission time and, when presence/absence of a body to be detected 11 is determined, the offset signal component is subtracted from a light reception signal level so that influence of noise, fluctuation or change of offset signal level is eliminated.

Figure 17:
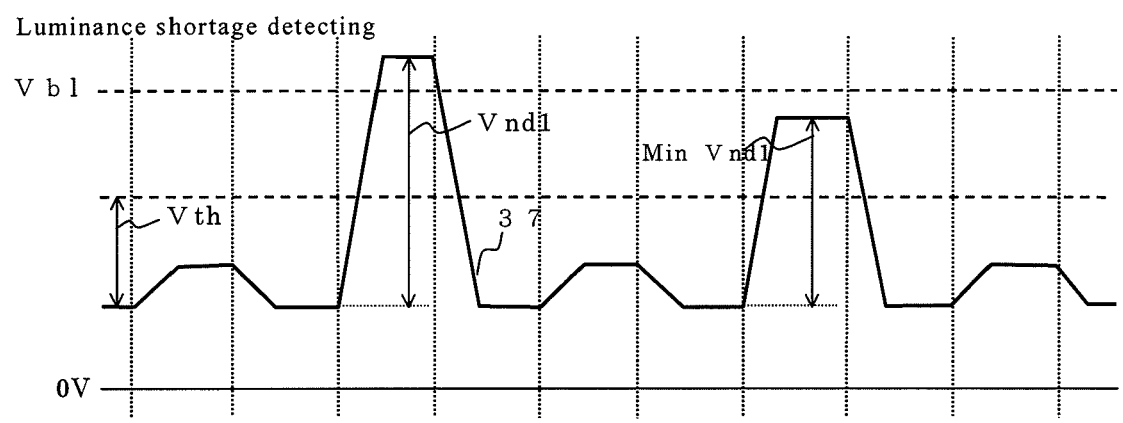
FIG. 17 is a time chart diagram showing a luminance shortage detecting function.

FIG. 17 is a time chart diagram showing a luminance shortage detecting function.

In the light reception signal PHD 37, when the minimum light reception signal Min Vnd1 of the light reception signal Vnd1 obtained when a body to be detected 11 is present at the logical value "1" state is lower than the sensitivity set limit value Vb1, luminance shortage is detected and adjustment is performed such that GAIN is raised to reach level of Vnd1 shown in FIG. 17.

Figure 18:
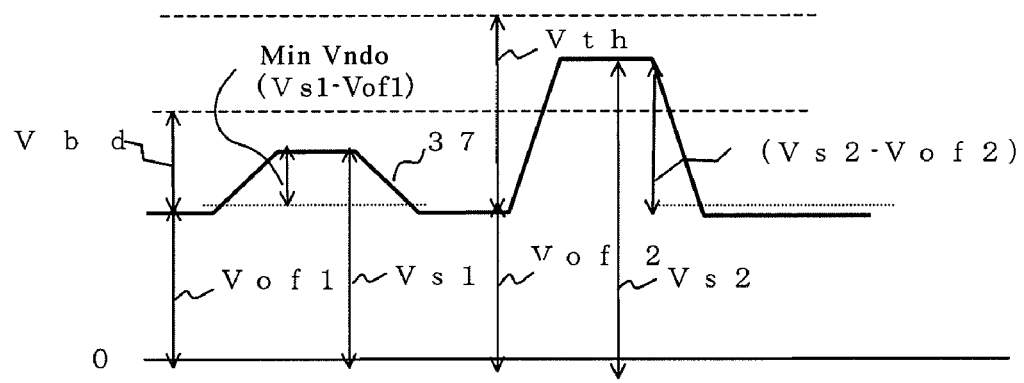
FIG. 18 is a time chart diagram showing a light emitting device failure.

FIG. 18 is a time chart diagram showing a light emitting device failure.

In the light reception signal PHD signal 37 in FIG. 18, a value obtained by subtracting offset signal Vof1 from light reception signal level Vs1, namely, (Vs1−Vof1) must generally exceed a light emitting device failure value Vbdf. The light emitting device failure value Vbdf is set to an intermediate value between the threshold Vth for determining presence/absence of a body to be detected and the offset signal level Vofn. When the Min Vnd0 which is the minimum light reception signal level, namely, the difference signal (Vs1−Vof1) is smaller than the light emitting device failure value Vbdf, it is found that the light emitting device is out of order. When the light emitting device is in a normal state, a light reception signal level when a body to be detected is absent in the light reception signal PHD signal, (Vs2−Vof2) exceeds the light emitting device failure value Vbdf. The light emitting device failure value Vbdf is provided as a criterion for light emitting device failure and, when the light reception signal example level is equal to or less than the criterion for light emitting device failure, warning for light emitting device failure is issued.

Figure 19:
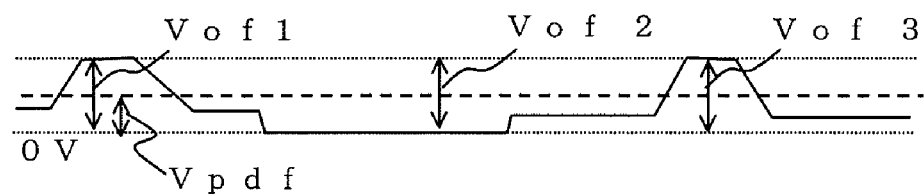
FIG. 19 is a time chart diagram showing a light receiving device failure.

FIG. 19 is a time chart diagram showing a light receiving device failure.

In FIG. 19, a light receiving device failure value Vpdf is a criterion for light receiving device failure. Offset signal level when the light receiving device is in a normal state is signal level exceeding the light receiving device failure value Vpdf like the offset signal level Vof1 of the channel 1 (CH1) or the offset signal level Vof3 of the channel 3 (CH3). On the other hand, an example of signal level of the light receiving device failure is shown by offset signal level Vof2 of the channel 2 (CH2) in FIG. 19. The offset signal level Vof2 of the channel 2 (CH2) is less than the light receiving device failure value Vpdf, which indicates failure of the light receiving device of the channel 2 (CH2). Simultaneously, warning for light receiving device failure is issued.

Figure 20:
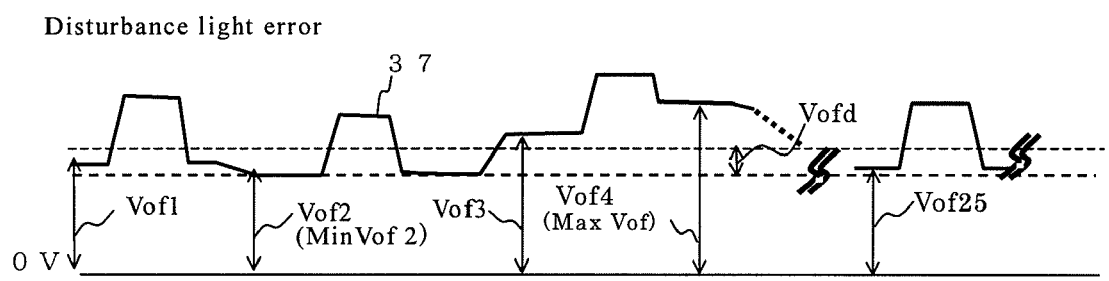
FIG. 20 is time chart diagram showing disturbance light error.

FIG. 20 is a time chart diagram showing disturbance light error.

In the case showed in FIG. 20, disturbance light abnormality is detected by using a disturbance light abnormality value Vofd. Then in the PHD signal 37 which is the light reception signal it is showen that disturbance light has generated at a light reception time of the channel 3 (CH3). Offset signal level in a normal state where no disturbance light has generated is shown in offset signal level Vof1 of the channel 1 (CH1), offset signal level Vof2 of the channel 2 (CH2), and offset signal level Vof25 of the channel 25 (CH25).

That is, the offset signal level Vof1, Vof2, and Vof25 are less than the criterion level shown by the disturbance light abnormality value Vofd at a non light emission time. The offset signal level Vof2 of the channel 2 (CH2) is the minimum of the offset signal level and it is stored as the minimum offset signal value MinVof2. In FIG. 20, an offset signal level Vof4 of the channel 3 (CH3) exceeds the disturbance light abnormality value Vofd despite non light emission time, which shows such a fact that the sensor has been subjected to disturbance light in a behavior time of the channel 3(CH3).

Figure 21:
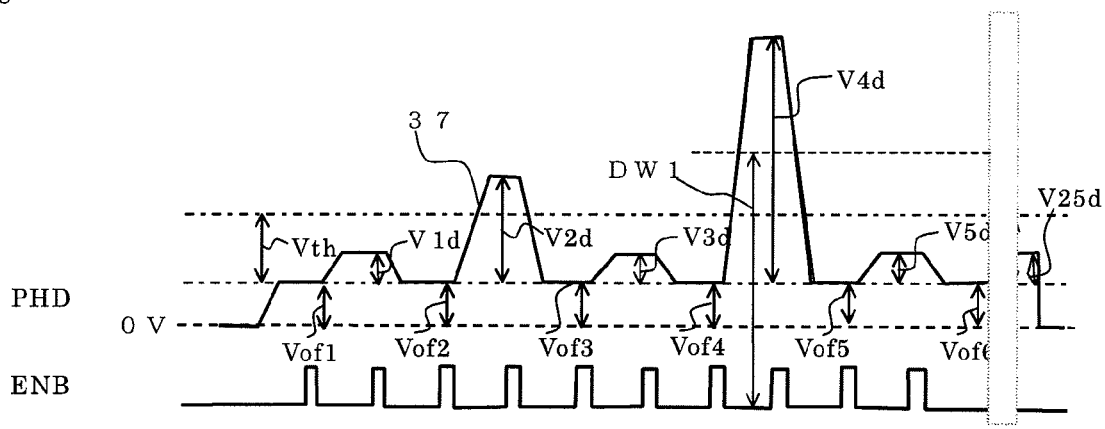
FIG. 21 is a time chart diagram at a detecting time of stacking of bodies to be detected.

FIG. 21 is a time chart diagram at a detecting time of stacking of bodies to be detected.

In FIG. 21, signal level V1$d$ of the channel 1 (CH1), signal level V3$d$ of the channel 3 (CH3), signal level V5$d$ of the channel 5 (CH5), and signal level V25$d$ of a channel 25 (CH25) in the PHD signal 37 which are light reception signals at light emission time are less than the threshold Vth for detecting a body to be detected, which indicates absence of a body to be detected (logical value "0").

On the other hand, signal level V2$d$ of the channel 2 (CH2) and signal level V4$d$ of the channel 4 (CH4) exceed the threshold Vth for detecting a body to be detected, which indicates presence of a body to be detected (logical value "1"). However, when signal level V2$d$ of the channel 2 (CH2) and signal level V4$d$ of the channel 4 (CH4) are compared with each other, in the signal level V4$d$ of the channel 4 (CH4) is larger and exceed a superposition detection value DW1, and it exceeds an ordinary a body to be detected presence (logical value "1") state. Since a reflection signal in this state is larger than that from one body to be detected, it is found that bodies to be detected are stacked to one another in the former, so that warning for stack detection is issued.

Figure 22:
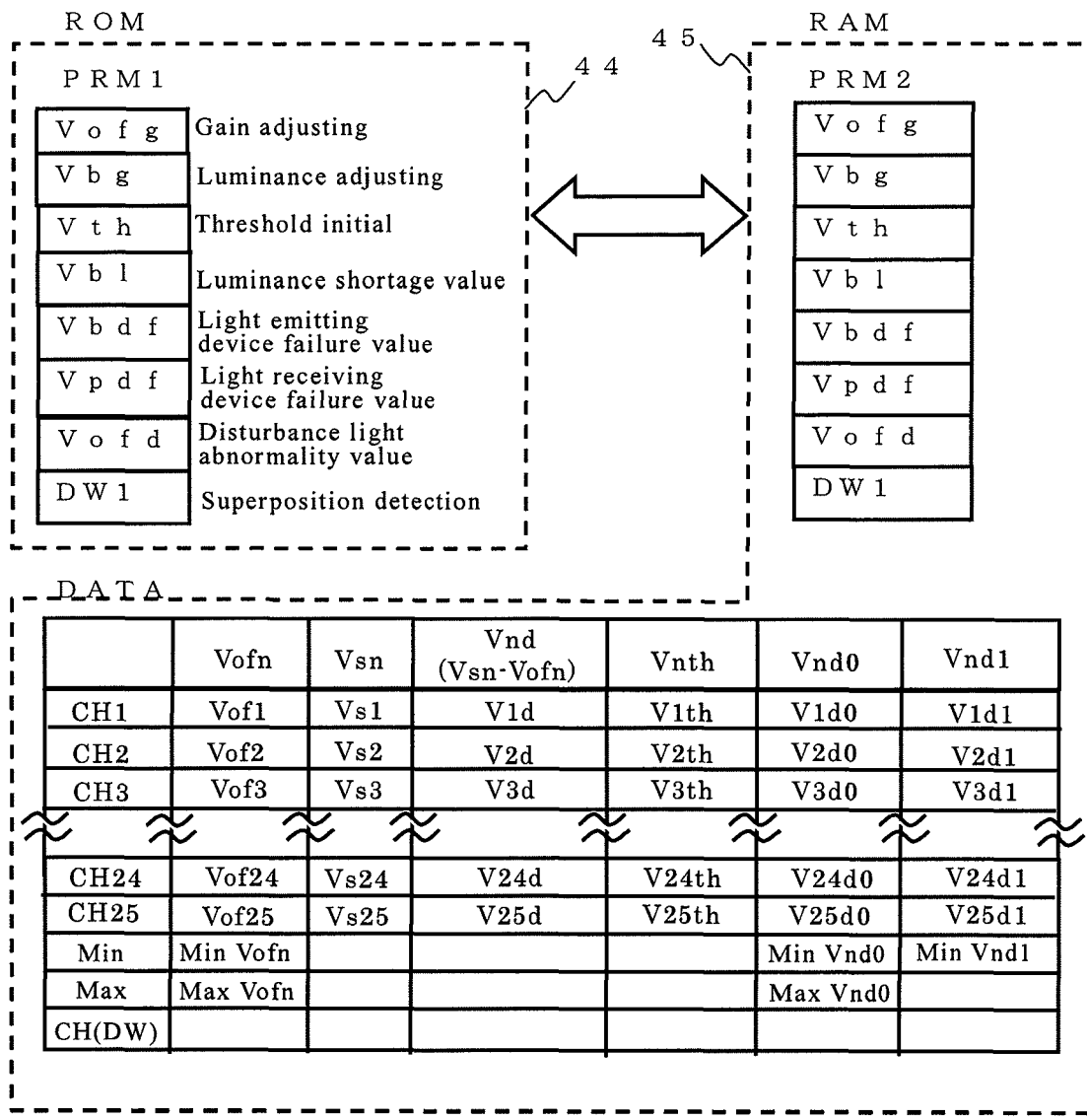
FIG. 22 is a storage memory map diagram of a storage element.

FIG. 22 is a storage memory map diagram of a storage element.

In a region of ROM 44 which is a nonvolatile memory region, a gain adjusting value Vofg, a luminance adjusting value Vbg, a threshold initial value Vth, a luminance shortage value Vb1, a light emitting device failure value Vbdf, a light receiving device failure value Vpdf, and a disturbance light abnormality value Vofd, and a superposition detection value DW1 are stored and held. A program performing control using these parameters is PRM1.

On the other hand, rewritable data is stored in the RAM 45 region, namely, a gain adjusting value Vofg, a luminance adjusting value Vbg, a threshold initial value Vth, a luminance shortage value Vb1, a light emitting device failure value Vbdf, a light receiving device failure value Vpdf, and a disturbance light abnormality value Vofd which are automatically set according to program control are stored and held therein. A program for controlling RAM 45 region using these data parameters is PRM2.

In a DATA region in the RAM 45, Vof1 to Vof25 regarding offset Vofn, Vs1 to Vs25 regarding Vsn regarding light reception signal level Vs1 at a light emission time, V1$d$ to V25$d$ regarding difference signal data (light reception signal level) Vnd which is (Vsn−Vofn) are stored and held to the respective channels of the channel 1 (CH1) to the channel 25 (CH25).

Further, V1$th$ to V25$th$ regarding threshold value Vnth, V1$d$0 to V25$d$0 regarding light reception signal Vnd0 obtained when a body to be detected 11 is absent, V1$d$1 to V25$d$1 regarding light reception signal Vnd1 obtained when a body to be detected 11 is present are stored and held to the respective channels of the channel 1 (CH1) to the channel 25 (CH25).

Furthermore, as Min (minimum) data, the minimum offset signal MinVofn, the light reception signal levels MinVnd0 and MinVnd1 at the minimum light emission time are stored and held, the light reception signal level MaxVnd0 and the maximum offset signal MaxVofn at the maximum light emission time are stored and held as Max (maximum) data, and fluctuations of respective light reception signal levels are stored and held, so that state change of the photoelectronic sensor and abnormality thereof are detected.

Figure 23:
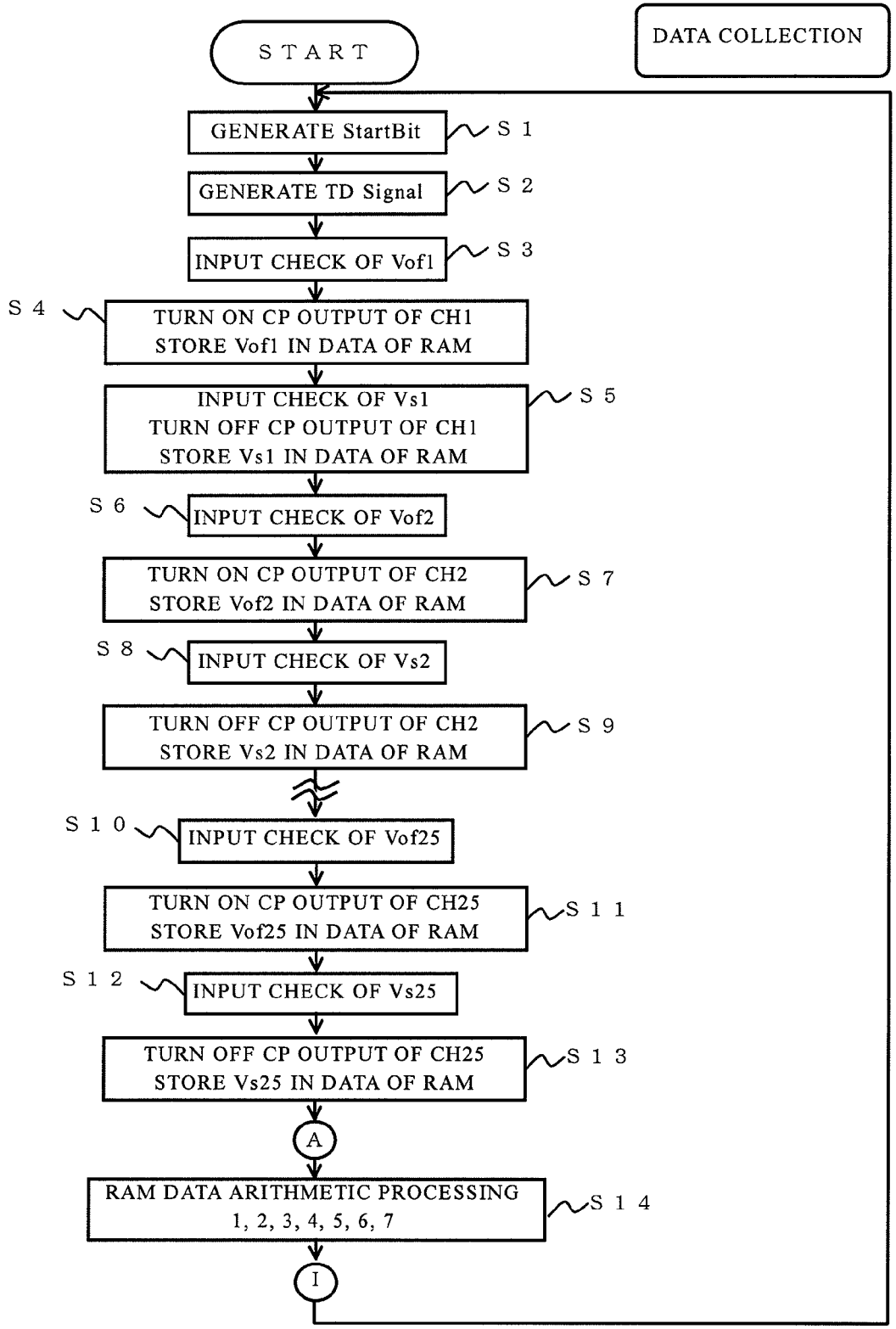
FIG. 23 is a flow chart diagram showing a DATA collecting function.

FIG. 23 is a flowchart diagram representing a DATA collecting function.

A procedure for DATA collection starts from start (START), where StartBit generation which is a signal of DATA collection start is first performed (Step S1). Next, TD signal actuating the sensor section is generated (Step S2). Next, input check of offset signal level Vof1 is performed as light reception signal level at non light emission time (Step S3).

Clock pulse CP output of the channel 1 (CH1) is turned ON. The offset signal level Vof1 of the channel 1 previously taken in is stored in the DATA region of RAM (Step S4). Next, input which is light reception signal level Vs1 at a light emission time is checked. The clock pulse CP output of the channel 1 (CH1) is turned OFF. The light reception signal level Vs1 at a light emission time is stored in the DATA region of RAM (Step S5).

Next, input of offset signal level Vof2 is checked (Step S6).

Clock pulse CP output of the channel 2 (CH2) is turned ON. The offset signal level data Vof2 is stored in the DATA region of RAM (Step S7). Next, input which is light reception signal level Vs2 at the light emission time is checked (Step S8).

The clock pulse CP output of the channel 2 (CH2) is turned OFF. Subsequently, Vs2 is stored in the DATA region of RAM (Step S9). Similarly, data are sequentially taken in so that input of offset signal level Vof25 of the final channel 25 in this example is checked (Step S10).

Subsequently, clock pulse CP output of the channel 25 (CH25) is turned ON.

The offset signal level Vof25 is stored in the DATA region of RAM (Step S11).

Next, input of light reception signal level Vs25 at a light emission time is checked (Step S12).

Subsequently, the clock pulse CP output of the channel 25 (CH25) is turned OFF. The light reception signal level Vs25 at a light emission time is stored in the DATA region of RAM (Step S13).

Next, respective arithmetic processings of 1 to 7 are performed as arithmetic processing of RAMDATA (Step S14). Then the procedure is returned to the first step.

Figure 24:
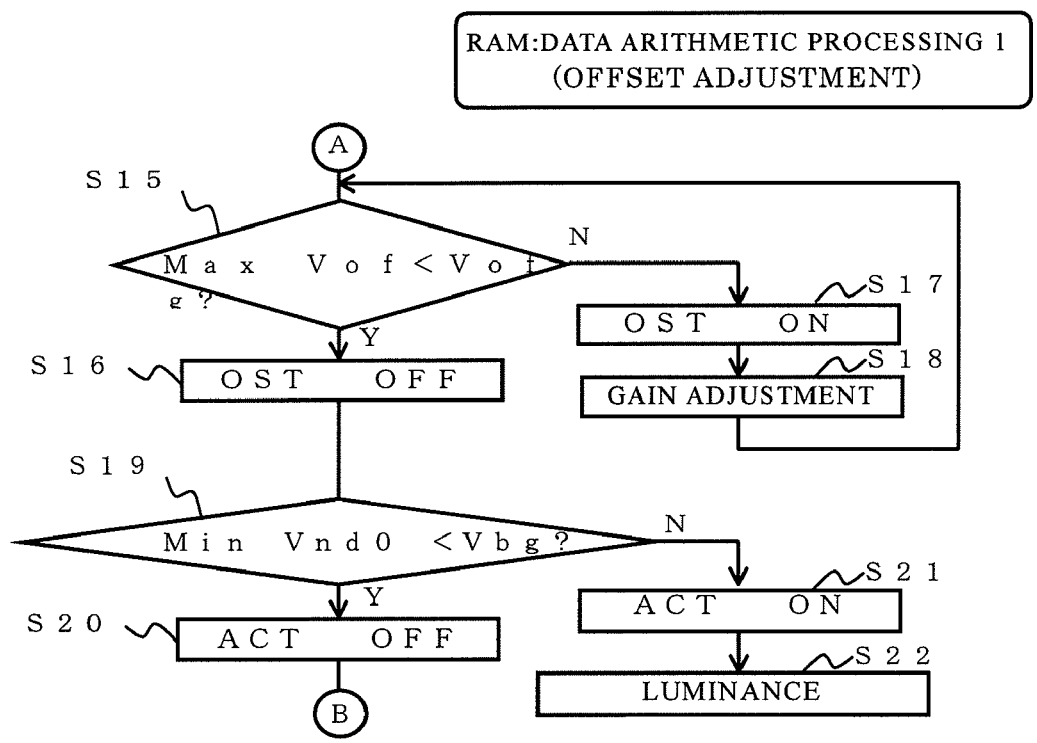
FIG. 24 is a flow chart diagram showing a RAM DATA arithmetic processing 1.

FIG. 24 is a flowchart of a RAM DATA arithmetic processing 1 for performing offset adjustment. First of all in this arithmetic processing, comparative judgment is made about whether or not the maximum signal level Max Vof of offset is smaller than the gain adjustment value Vofg (Step S15). When Max Vof is smaller than the gain adjustment value Vofg, offset signal OST is turned OFF (Step S16). When Max Vof is larger than the gain adjustment value Vofg, the offset signal OST is turned ON (step S17), and GAIN adjustment is then performed (Step S18). Then the procedure is returned back to the first step of the program.

Next, determination is made about whether or not the minimum light reception signal Min Vnd0 is smaller than the luminance adjustment value Vbg (Step S19). When the minimum light reception signal Min Vnd0 is smaller than the luminance adjustment value Vbg, action signal ACT is turned OFF (Step S20). When the minimum light reception signal Min Vnd0 is larger than the luminance adjustment value Vbg, ACT is turned ON (Step S21), and the procedure is returned back to the top of the step S19 after luminance adjustment has been performed (Step S22).

Figure 25:
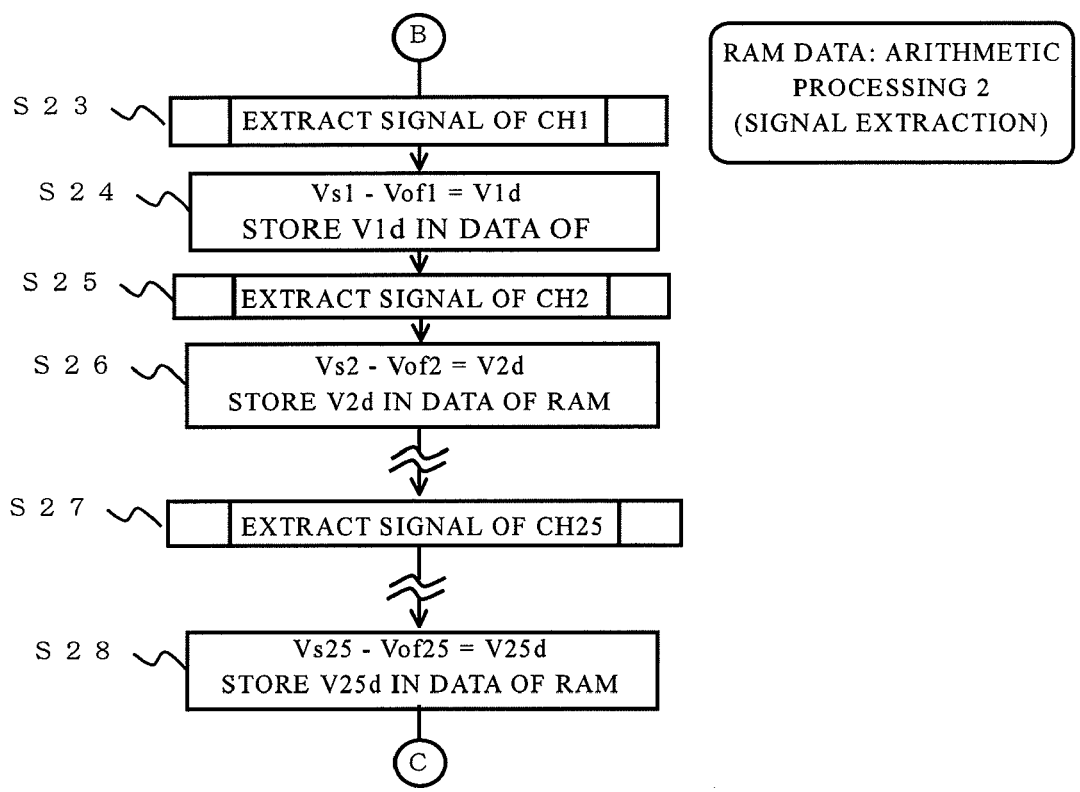
FIG. 25 is a flow chart diagram showing a RAM DATA arithmetic processing 2.

FIG. 25 is a flowchart of a RAM DATA arithmetic processing 2 for performing signal extraction.

First of all, signal extraction of the channel 1 (CH1) is performed (Step S23).

Next, offset signal level Vof1 at non light emission time is subtracted from light reception signal level Vs1 at a light emission time to calculate signal level V1$d$ of the channel 1 (CH1), and the calculation result of the signal level V1$d$ is stored in the DATA region of RAM (Step S24).

Similarly, signal extraction of the channel 2 (CH2) is performed (step S25), signal level V2$d$ is calculated (Step S26), and V2$d$ is stored in the DATA region of RAM. Similarly, signal extractions from the channel 3 to the channel 24 are performed, and V3$d$ to V24$d$ are stored in the DATA region of RAM. Finally, CH 25 signal is extracted (Step S27), signal level V2$d$ is calculated, and V25$d$ is stored in the DATA region of RAM (Step S28).

Figure 26:
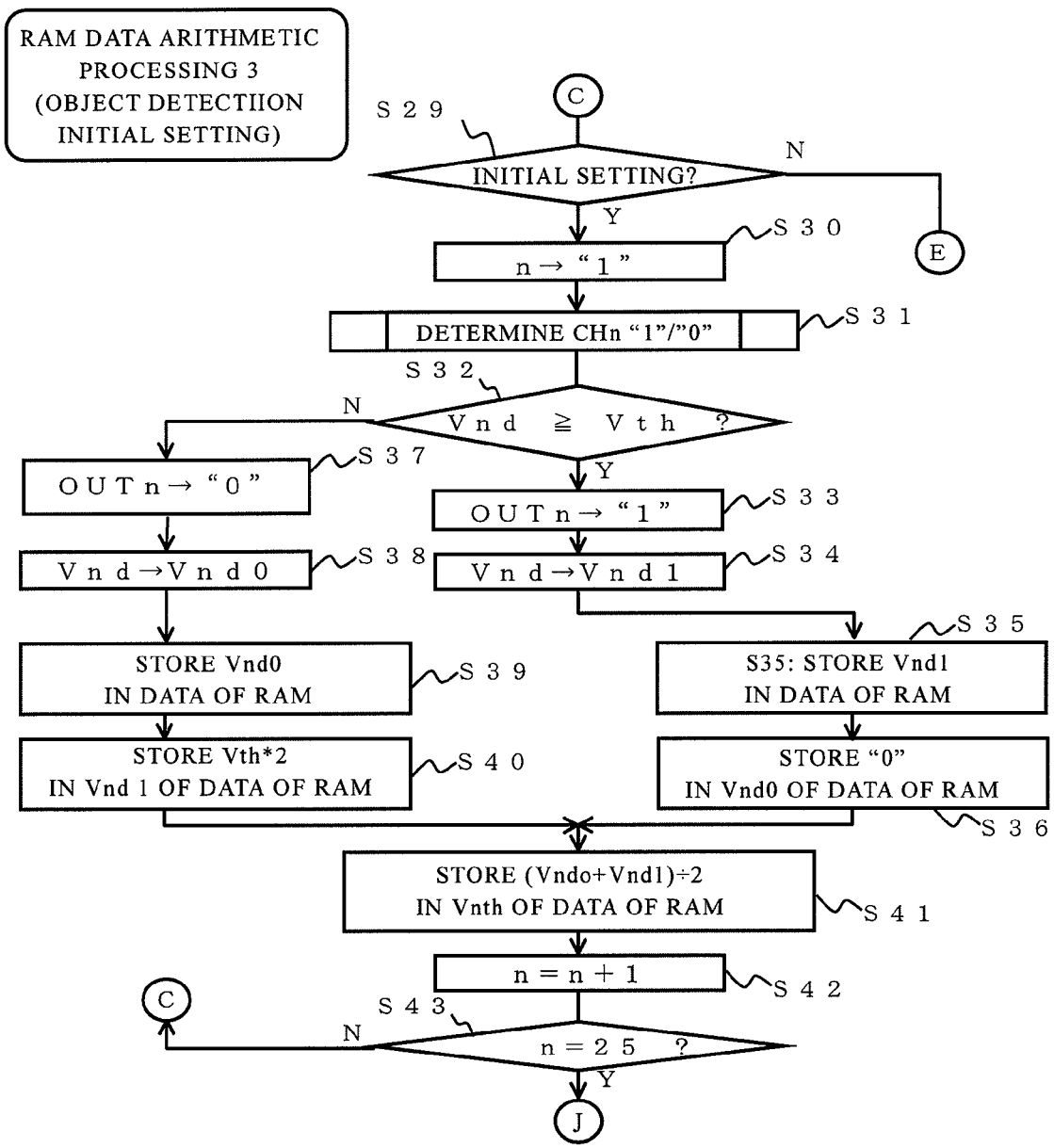
FIG. 26 is a flow chart diagram showing a RAM DATA arithmetic processing 3.
Figure 27:
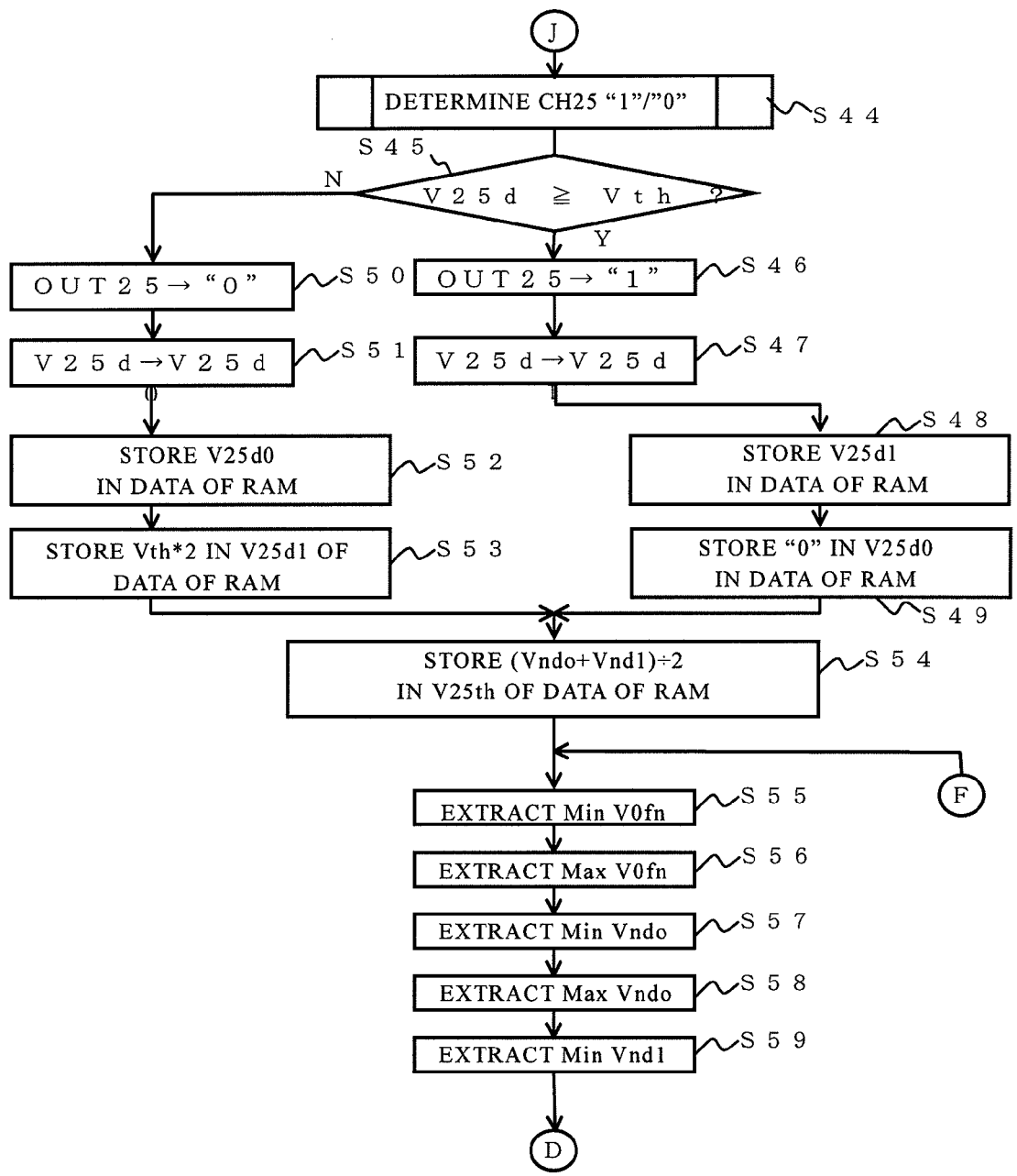
FIG. 27 is a flow chart diagram showing a part of RAM DATA arithmetic processing 3 continuing to FIG. 25.

FIG. 26 and FIG. 27 are flowchart diagrams of a RAM DATA arithmetic processing 3 for performing initial setting of object detection.

First of all, determination about whether the processing is initial setting is made (Step S29). When the processing is the initial setting, "1" is set in a counter n (Step S30).

Determination is made about whether the detection result of the channel n (CHn) is present "1" or is absent "0" (step S31). Next, determination is made about whether the light reception signal level Vnd of n channel exceeds the threshold Vth (Step S32). If Vnd≧Vth is satisfied, "1" is set in OUTn (Step S33). Subsequently, Vnd is stored in Vnd1 (Step S34).

Vnd1 is stored in the DATA region of RAM (Step S35).

Next, "0" is stored in Vnd1 of the DATA region of RAM (Step S36).

Unless Vnd≧Vth is satisfied, "0" is set in OUTn (Step S37).

Next, Vnd data is transferred to Vnd0 (Step S38). Vnd0 is stored in the DATA region of RAM (Step S39).

Next, data of double of Vth is stored in the DATA region of RAM, and further, storing to Vnd1 is performed (Step S40).

Next, operation of (Vnd0+Vnd1)÷2 is performed, and Vnth is stored in the DATA region of RAM (Step S41).

1 is added to the counter n (Step S42).

Whether or not the counter n has reached 25 is confirmed (Step S43).

In the flowchart diagram, (Vnd0+Vnd1)÷2 is used as the threshold Vnth, but the threshold Vnth can be set to be higher or lower than (Vnd0+Vnd1)÷2 by multiplying the intermediate data by a coefficient. In this case, when an amount of light configuring noise component received from an environment is large, the threshold Vnth is set to be higher but the threshold Vnth is set to be lower in a noiseless environment, so that detection sensitivity can be increased. One of using a fixed threshold Vnth stored in the ROM and providing for the next detection time while a threshold is calculated in each case can be freely selected.

Subsequently, being showed in FIG. 27, determination about presence/absence of logical value "1"/"0" of a body to be detected of the channel 25 (CH25) is performed (Step S44).

Determination is made about whether or not the light emission time light reception signal level V25$d$ at light reception time of the channel 25 (CH25) exceeds the threshold Vth (Step S45). If V25$d$≧Vth is satisfied, OUT25 is set to "1" (Step S46). V25$d$ is transferred to V25$d$1 (Step S47).

V25$d$1 data is stored in the DATA region of RAM (Step S48).

"0" is stored in V25$d$0 of the DATA region of RAM (Step S49).

Unless 25$d$≧Vth is satisfied, "0" is set in OUT25 (Step S50).

Data of V25$d$ is transferred to V25$d$0 (Step S51).

Data of V25$d$0 is transferred to the DATA region of RAM (Step S52).

A value of double of Vth is stored in the DATA region of RAM (Step S53).

The half value of (V25do+V25d1) is stored in V25th of the DATA region of RAM (Step S54).

The minimum offset level Min V0fn is extracted (Step S55).

The maximum offset level Max V0fn is extracted (Step S56).

The minimum light reception signal level Min Vndo is extracted (Step S57).

The maximum light reception signal level Max Vndo is extracted (Step S58).

The minimum light reception signal level Min Vnd1 is extracted (Step S59).

Figure 28:
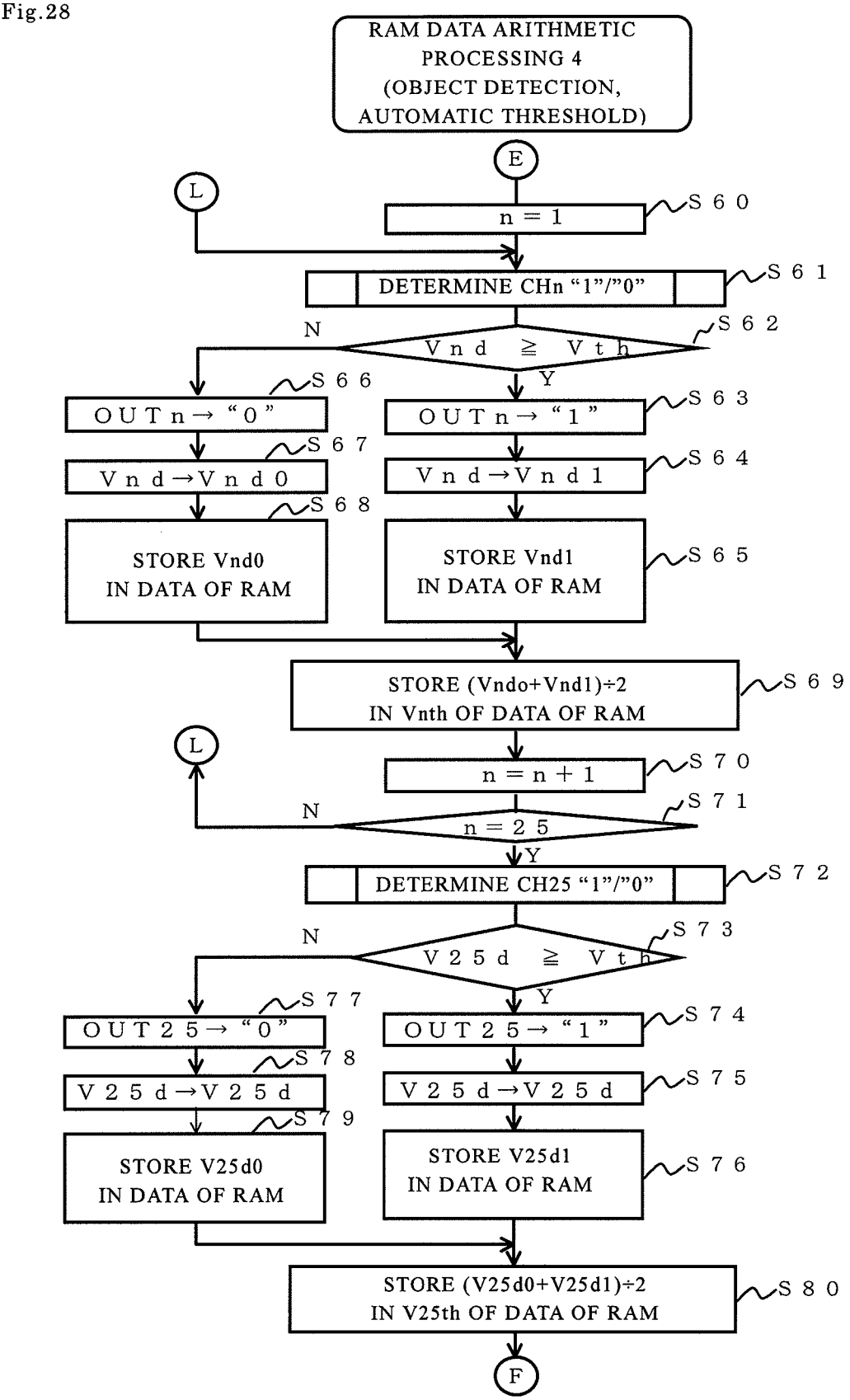
FIG. 28 is a flow chart diagram showing a RAM DATA arithmetic processing 4.

FIG. 28 is a flowchart diagram of a RAM DATA arithmetic processing 4 for object detection and threshold automatic setting continued from E terminal on the flowchart shown in FIG. 26.

First of all in this arithmetic processing, 1 is set in the counter n (Step S60).

Next, determination about logical value "1"/"0" representing presence/absence of a body to be detected of CHn is made (Step S61).

Next, determination is made about whether the light reception signal level Vnd of n channel exceeds the threshold Vth (step S62).

If Vnd≧Vth is satisfied, "1" is set to OUTn (Step S63).

Data of Vnd is transferred to Vnd1 (Step S64).

Vnd1 is stored in the DATA region of RAM (Step S65).

Unless Vnd≧Vth is satisfied, "0" is set to OUTn (Step S66).

Data of Vnd is transferred to Vnd0 (Step S67).

Vnd0 is stored in the DATA region of RAM (Step S68).

The haof value of (Vndo+Vnd1)÷2 is stored in the Vnth of the DATA region of RAM (Step S69).

Subsequently, 1 is added to the counter n (Step S70).

Determination about whether or not n=25 is satisfied is made (step S71).

If n=25 is satisfied, determination about whether or not CH 25 is logical value "1"/"0" is made (Step S72).

Unless n=25 is satisfied, the procedure is continued to L terminal.

Next, determination is made about whether the light reception signal level Vnd of n channel exceeds the threshold Vth (Step S73).

If V25d≧Vth is satisfied, "1" is set in OUT25 (Step S74).

Data of V25d is transferred to V25d1 (Step S75).

V25d1 is stored in the DATA region of RAM (Step S76).

Unless V25d≧Vth is satisfied, "0" is set to OUT25 (Step S77).

Data of V25d is transferred to V25d0 (Step S78).

V25d0 is stored in the DATA region of RAM (step S79).

The haof value of (V25d0+V25d1) is stored in V25th of the DATA region of RAM (Step S80).

Figure 29:
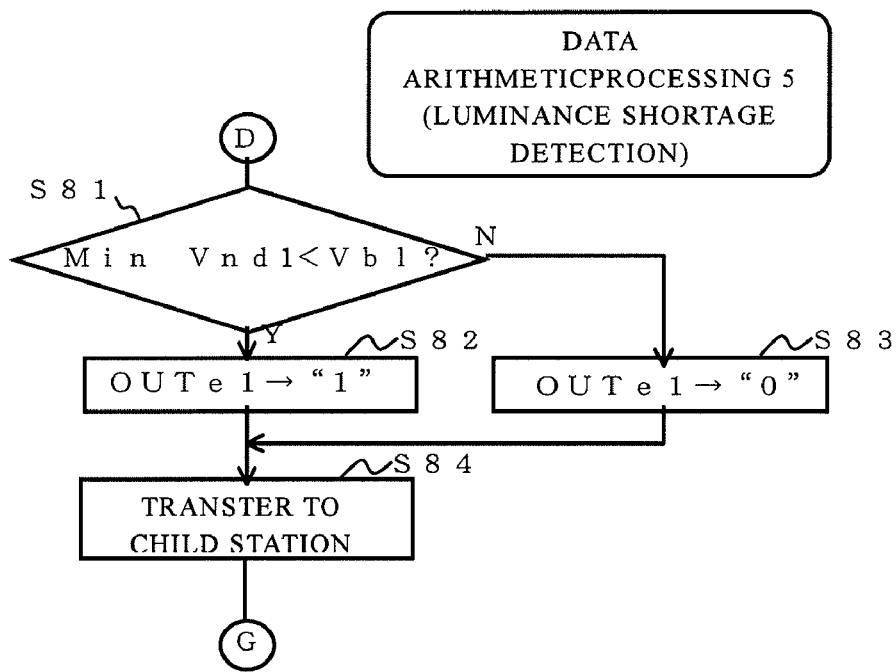
FIG. 29 is a flow chart diagram showing a RAM DATA arithmetic processing 5.

FIG. 29 is a flowchart diagram of a RAM DATA arithmetic processing 5 for performing luminance shortage detection continued from D terminal on the flowchart diagram shown in FIG. 27.

First of all in this arithmetic processing, determination about whether or not Min Vnd1<Vb1 is satisfied is made (Step S81).

If Min Vnd1<Vb1 is satisfied, "1" is set in OUTe1 (Step S82).

Unless Min Vnd1<Vb1 is satisfied, "0" is set to OUTe1 (Step S83).

Then, data is transferred to the child station output section (Step S84).

Figure 30:
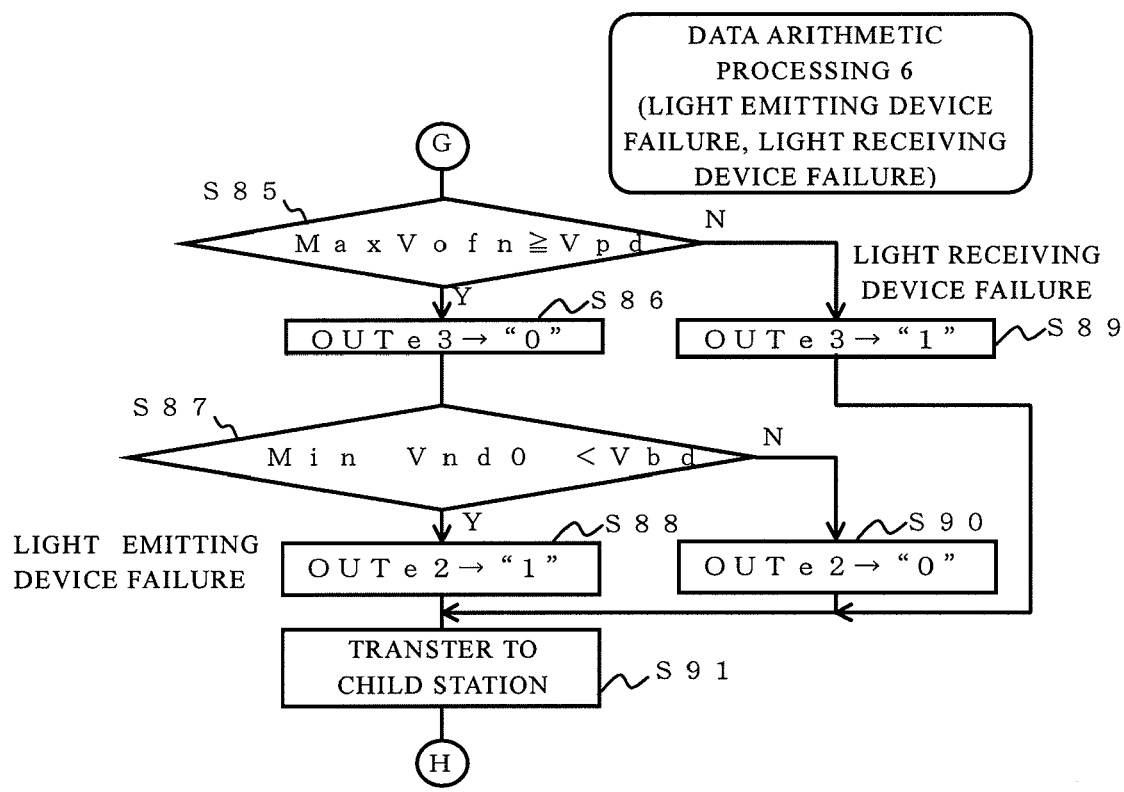
FIG. 30 is a flow chart diagram showing a RAM DATA arithmetic processing 6.

FIG. 30 is a flowchart diagram of a RAM DATA arithmetic processing 6 for detecting light emitting device and light receiving device failure continued from G terminal on the flowchart diagram shown in FIG. 29.

First of all in this arithmetic processing, determination about whether or not Max Vofn≧Vpdf is satisfied is made (Step S85).

If Max Vofn≧Vpdf is satisfied, "0" is set in OUTe3 (Step S86).

Subsequently, determination about whether or not Min Vnd0<Vbdf is satisfied is made (Step S87).

If Min Vnd0<Vbdf is satisfied, light emitting device failure is detected, and "1" is set in OUTe2 (Step S88).

Unless Min Vnd0<Vbdf is satisfied, "0" is set in OUte2 (Step S90).

On the other hand, unless Max Vofn≧Vpdf is satisfied, light receiving device failure is detected, and "1" is set in OUTe3 (Step S89).

Then, data is transferred to the child station output section (Step S91).

Figure 31:
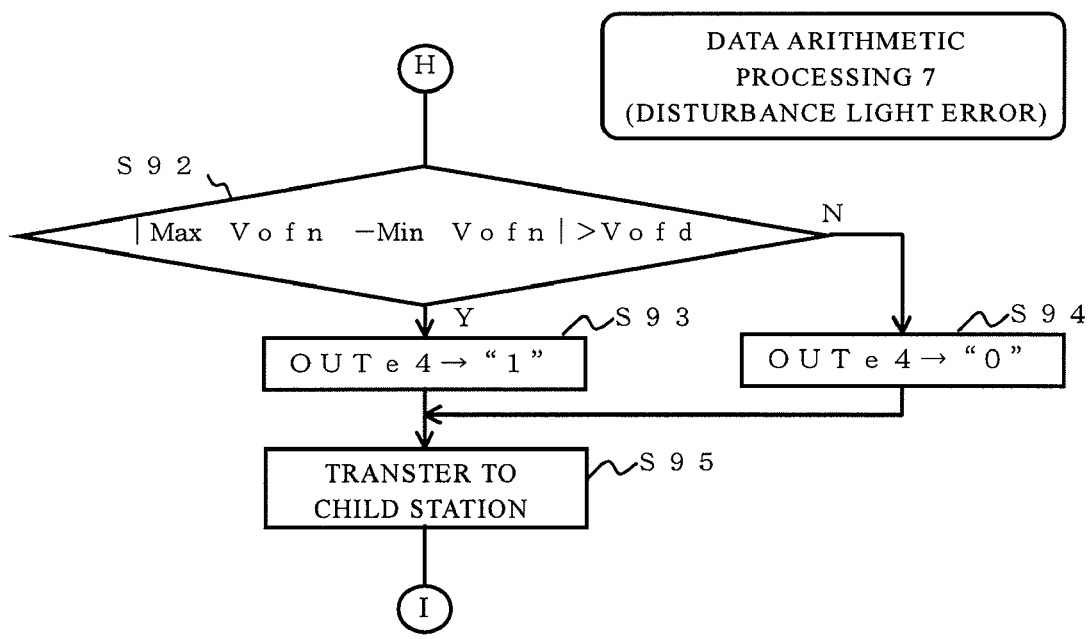
FIG. 31 is a flow chart diagram showing a RAM DATA arithmetic processing 7.

FIG. 31 shows a flowchart diagram representing DATA arithmetic processing function 7 according to the embodiment of the present invention. FIG. 31 is a flowchart diagram of a RAM DATA arithmetic processing 7 for detecting disturbance light error continued from H terminal on the flowchart shown in FIG. 30.

First of all in this arithmetic processing, determination about whether or not |Max Vofn−Min Vofn|>Vofd is satisfied is made (Step S92).

If |Max Vofn−Min Vofn|>Vofd is satisfied, "1" is set in OUTe4 (Step S93).

Unless |Max Vofn−Min Vofn|>Vofd is satisfied, "0" is set in OUTe4 (Step S94).

Then, Data is transferred to the child station output section (Step S95).

Figure 32:
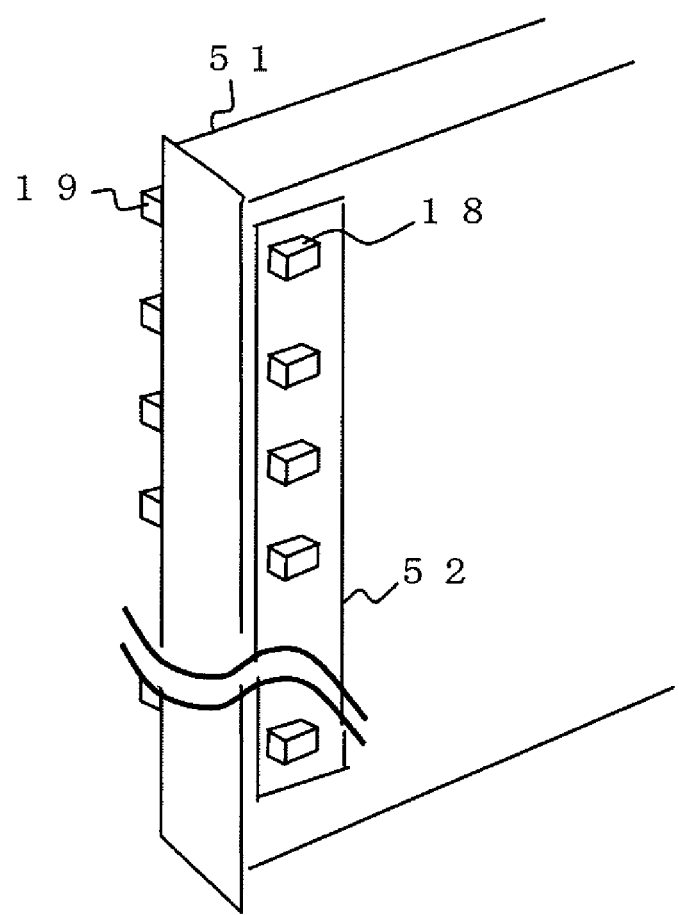
FIG. 32 is an illustrative diagram of light emitting devices and light receiving devices.

FIG. 32 is an illustrative diagram of a light emitting device and a light receiving device.

In FIG. 32, light emitting elements 18 are attached on a surface of a printed board 51 and light receiving elements 19 are attached on a back surface thereof, and a plurality of light emitting devices and a plurality of light receiving devices can be arranged on a small area by light-shielding the light emitting elements 18 and the light receiving elements 19 using a light-shielding plate 52, so that size reduction of a photoelectronic sensor can be realized. The light emitting elements 18 can be attached on the back surface and the light receiving elements 19 can be attached on the front surface, namely they can be attached on the surfaces in opposite manner described above.

INDUSTRIAL APPLICABILITY

When detection of presence/absence of bodies to be detected, such as semiconductor wafers, liquid crystal glasses, or glass epoxy substrates stored in a multistage manner is detected, setting of sensors arranged in a multistage manner can be collectively performed by utilizing the present invention, so that adjustment work is made easy. Further, the photoelectronic sensor of the present invention is higher in sensitivity and simpler than that of the conventional one, which results in handling easiness and, can be utilized as an inexpensive photoelectronic sensor, which is widely used for detection of presence/absence of articles on an article shelf.

What is claimed is:

1. A photoelectronic sensor system, comprising a parent station which transmits and receives a monitoring signal and a control signal as parallel signals to a control section, and a plurality of photoelectronic sensors connected to the parent station by a transmission line, wherein each photoelectronic sensor has a child station input/output section, a sensor control section, and a sensor section, the child station input/output section acquires a control signal directed to its own sensor section to perform control output to the sensor section and feeds a monitoring signal to the transmission line as a detection result of the sensor section, the control signal directed to the own sensor section is included in serial transmission signals transmitted through the transmission line, the sensor section includes one pair or plural pairs of a light emitting device and a light receiving device, the sensor control section is disposed between the child station input/output section and the sensor section and comprises an A/D (analog to digital) converter, a microprocessor unit (MPU), a luminance adjusting circuit, a detection driving circuit, and a detecting circuit, the A/D converter converts analog signals signal detected by the sensor section to digital signal data, the luminance adjusting circuit generates a driving clock pulse signal driving the light emitting device in a time divisional manner by the control signal or according to a determination result of the MPU, and the MPU circuit detects a light reception level of the light receiving device, where light reception level data at a non light emission time of the light emitting device is stored as low light amount level data, a difference data is obtained by subtracting the low light amount level data from light reception level data at a light emission time from the light emitting device, presence/absence of a body to be detected is determined based upon a relationship between the difference data and a predetermined threshold, and an intermediate value of the difference data or a value obtained by multiplying the intermediate value by a coefficient is stored as the predetermined threshold.

2. The photoelectronic sensor system according to claim 1, wherein, when the light reception level when the light emission signal is received is lowered to a predetermined level, the MPU determines degradation of the light receiving device or the light emitting device, or loss of transparency of the sensor section and outputs a failure detection signal.

3. The photoelectronic sensor according to claim 1, wherein, when the low light amount level data is higher in level as compared with a disturbance light abnormality value, the MPU outputs an error signal as detection of disturbance light.

* * * * *